(12) United States Patent
Goff et al.

(10) Patent No.: US 11,368,183 B2
(45) Date of Patent: Jun. 21, 2022

(54) SYSTEMS AND METHODS FOR SYNCHRONIZING TIME, FREQUENCY, AND PHASE AMONG A PLURALITY OF DEVICES

(71) Applicant: ENSCO, Inc., Springfield, VA (US)

(72) Inventors: Daniel Thomas Goff, Springfield, VA (US); William Todd Faulkner, Asheville, NC (US); Robert Barlow Alwood, Springfield, VA (US); Bradley David Farnsworth, Florham Park, NJ (US); Edward Joseph Kreinar, Springfield, VA (US); David W. A. Taylor, Jr., Greensboro, NC (US)

(73) Assignee: ENSCO, Inc., Springfield, VA (US)

( * ) Notice: Subject to any disclaimer, the term of this patent is extended or adjusted under 35 U.S.C. 154(b) by 65 days.

(21) Appl. No.: 16/908,255

(22) Filed: Jun. 22, 2020

(65) Prior Publication Data
US 2020/0403652 A1 Dec. 24, 2020

Related U.S. Application Data

(60) Provisional application No. 62/865,115, filed on Jun. 21, 2019.

(51) Int. Cl.
| *H04W 4/00* | (2018.01) |
| *H04B 1/7087* | (2011.01) |
| *H04J 3/06* | (2006.01) |
| *H04B 1/7075* | (2011.01) |

(52) U.S. Cl.
CPC ......... *H04B 1/7087* (2013.01); *H04B 1/7075* (2013.01); *H04J 3/0617* (2013.01); *H04J 3/0644* (2013.01)

(58) Field of Classification Search
CPC ... H04B 1/7087; H04B 1/7075; H04J 3/0617; H04J 3/0644; H04J 3/0682; H04W 56/0015; H04W 56/0035; H04W 56/0065
See application file for complete search history.

(56) References Cited

U.S. PATENT DOCUMENTS

| 6,067,039 | A | * | 5/2000 | Pyner | G01S 13/79 342/125 |
| 6,122,329 | A | * | 9/2000 | Zai | G01S 13/751 342/42 |
| 6,744,398 | B1 | * | 6/2004 | Pyner | G01S 13/825 342/125 |
| 8,199,047 | B2 | | 6/2012 | Fretenburg et al. | |
| 9,271,258 | B2 | | 2/2016 | Taylor et al. | |
| 2001/0053699 | A1 | * | 12/2001 | McGrady | G01S 5/14 455/513 |
| 2003/0195723 | A1 | * | 10/2003 | Bensky | G01S 13/84 702/189 |
| 2008/0077326 | A1 | * | 3/2008 | Funk | G08B 25/016 701/500 |
| 2012/0133558 | A1 | * | 5/2012 | Fretenburg | G01S 13/84 342/378 |
| 2014/0207374 | A1 | * | 7/2014 | Taylor, Jr | G01C 21/206 701/470 |

(Continued)

*Primary Examiner* — Stephen M D Agosta
(74) *Attorney, Agent, or Firm* — Kaplan Breyer Schwarz, LLP

(57) ABSTRACT

Aspects of the present disclosure describe a system and method for synchronizing time, frequency, and phase among a plurality of devices.

8 Claims, 19 Drawing Sheets

(56) References Cited

U.S. PATENT DOCUMENTS

| | | | | |
|---|---|---|---|---|
| 2014/0248841 A1* | 9/2014 | Kluge | .................... | G01S 11/02 |
| | | | | 455/67.11 |
| 2015/0346332 A1* | 12/2015 | Taylor, Jr | ................ | G01S 13/84 |
| | | | | 342/458 |
| 2015/0346349 A1* | 12/2015 | Taylor, Jr | .............. | G01S 5/0263 |
| | | | | 342/357.24 |
| 2015/0351067 A1* | 12/2015 | Taylor, Jr | ................ | H04W 8/08 |
| | | | | 455/456.1 |

* cited by examiner

*Measurement Request*

ORIGINATOR BEGINS TRANSMISSION OF CARRIER SIGNAL AND STARTS BASEBAND CLOCK CYCLE COUNTER

↓

TRANSPONDER RECEIVES CARRIER SIGNAL: TRANSPONDER STARTS BASEBAND CLOCK CYCLE COUNTER, DETERMINES CARRIER PHASE, CARRIER PHASE SLOPE, CODE PHASE AND CODE-PHASE SLOPE

*Measurement Reply*

↓

TRANSPONDER BEGINS TRANSMISSION OF CARRIER SIGNAL AND TRANSMITS MEASUREMENTS AND NUMBER OF ELAPSED BASEBAND CLOCK CYCLES AS REPLY TO ORIGINATOR

↓

ORIGINATOR RECEIVES REPLY CARRIER SIGNAL: ORIGINATOR MEASURES NUMBER OF ELAPSED BASEBAND CLOCK CYCLES, DETERMINES CARRIER PHASE, CARRIER PHASE SLOPE, CODE PHASE AND CODE-PHASE SLOPE

↓

ORIGINATOR DETERMINES ROUND-TRIP TIME OF FLIGHT, BASEBAND-PHASE OFFSET, BASEBAND FREQUENCY OFFSET – DETERMINED FROM CARRIER PHASE SLOPES

↓

ORIGINATOR STEERS FREQUENCY AND PHASE OF ORIGINATOR TCR BASEBAND CLOCK TO TRANSPONDER TCR BASEBAND CLOCK

*FIG. 23*

SYSTEMS AND METHODS FOR SYNCHRONIZING TIME, FREQUENCY, AND PHASE AMONG A PLURALITY OF DEVICES

CROSS REFERENCE

This disclosure claims the benefit of U.S. Provisional Patent Application Ser. No. 62/865,115 filed Jun. 21, 2019.

TECHNICAL FIELD

This disclosure relates generally to geolocation, and, more particularly, to positioning and time synchronization systems, structures, and methods comprising multiple devices.

BACKGROUND

Global navigation satellite systems (GNSS)—such as the Global Positioning System (GPS)—have found widespread applicability providing ubiquitous Positioning, Navigation, and Timing (PNT) service(s) worldwide. GPS in particular, can provide nanosecond-level time of day as well as sub-meter positioning. Despite such utility however, GPS is fragile and can be impaired or unavailable for many reasons, such as operation under canopy, or degradation from intentional or unintentional interference. Given this fragility, relative measurements of timing and ranging can provide a critical aid to PNT systems by improving applications that incorporate GPS, as well as enabling applications where GPS is unavailable or insufficient.

Unfortunately, contemporary systems capable of providing relative measurements of timing and ranging to PNT systems have achieved only centimeter-level estimation performance and nanosecond-level timing precision. While this performance level approaches the theoretical limits in a benign radio-frequency (RF) channel, it is inadequate for many applications.

SUMMARY

An advance in the art is made according to aspects of the present disclosure directed to systems, structures, methods for synchronizing and/or syntonizing at least one of frequency, phase, and time for clocks located on multiple platforms.

Systems, structures, and methods according to aspects of the present disclosure utilize round-trip, time-of-flight radio frequency (RF) ranging using baseband code phase of Direct Sequence Spread Spectrum (DSSS) modulated signals and carrier phase measurements to realize a measurement precision much better than one-millimeter standard deviation and approximately 15 cm/s velocity at a measurement rate of hundreds of independent measurements per second.

As will be appreciated by those skilled in the art—systems, structures, and methods according to aspects of the present disclosure advantageously enable:

a) Wireless synchronization of the phase and frequency of remote clocks; or
b) Wireless syntonization of the frequency of remote clocks; or
c) Synchronization of time and clock reference on distributed Timing Communications and Ranging (TCR) devices (referred to as "Synchronized Elements") to an absolute time/frequency reference such as a Universal Coordinated Time (UTC) reference; or
d) Wireless synchronization of TCR devices' fundamental or derived clocks to a Master Element's internal Network Time and frequency reference; or
e) Time synchronization of external devices' time and/or clocks to the Network Time and/or frequency of the Master Element through the dissemination of synchronized reference signals generated from the Synchronized Elements; or
f) any combination of a, b, c, d, and e.

As will be further appreciated—systems, methods, and structures according to aspects of the present disclosure are facilitated by methods for measuring:

a) round-trip, code phase time-of-flight,
b) round-trip, carrier phase time-of-flight,
c) code phase slope (used to determine baseband frequency offset),
d) code phase offset,
e) carrier phase slope (used to determine carrier frequency offset), and
f) carrier phase offset;

which enable estimation of the frequency, phase, and time relationships between the RF clock source on two or more TCR devices.

In further contrast to the prior art—systems, methods, and structures according to aspects of the present disclosure advantageously modify code phase and code phase slopes for a received RF signal that was transmitted from a first platform to a second platform and determines an offset between their respective baseband frequencies, as well as their phase offset, with significantly better accuracy than known in the art. Modified code phase and code phase slopes are derived from the carrier phase and/or the carrier phase slope measured for the RF signal.

Illustrative embodiments according to aspects of the present disclosure include a plurality of platforms each having fundamental, baseband, and RF clocks, where the baseband and RF clocks are derived from the fundamental clock(s) and the platforms operate cooperatively to synchronize or syntonize at least one of their respective clocks.

For example, in an illustrative synchronization of first and second platforms, the first platform transmits a first RF signal—including an embedded code—to the second platform. Upon such transmission, the first platform initiates a first counter that counts the number of baseband clock cycles that elapse after the transmission of the first RF signal.

When the second platform receives the first RF signal, it initiates a second counter that counts the number of baseband clock cycles that elapse after receipt of the first RF signal. The second platform also determines a carrier phase, carrier phase slope, code phase, and code phase slope for the first RF signal as received.

The second platform then transmits a second RF signal to the first platform, in which the code is again embedded. The second RF signal also includes the value (counts) of the second counter at the time of transmission of the second RF signal, as well as measured values for the carrier phase, carrier phase slope, code phase, and code phase slope for the first RF signal.

Upon receipt of the second RF signal, the first platform compares the values of the first and second counters, determines the time-of-flight of the round-trip signal, derives the separation distance between the two platforms, determines the code phase and code phase slopes of the second RF signal and modifies them based on at least one of the carrier phase and carrier phase slope of the second RF signal, and determines a baseband frequency and phase offset between the two platforms. The baseband clock of the first platform is then adjusted to synchronize it to the baseband clock of the second platform.

In illustrative embodiments wherein the RF clock source of a TCR device is (or is derived from) the fundamental clock source of the device—and according to further aspects of the present disclosure—the frequency and phase relationships of the fundamental clocks can advantageously be used to control and/or steer the fundamental clock or a derived clock or counter. Through this control, one or more TCR devices can have their fundamental clocks or derived clocks or counters synchronized and/or syntonized to a controlling "Master Element" TCR device's fundamental clock or a derived clock.

An illustrative embodiment according to aspects of the present disclosure is a system comprising a plurality of mobile platforms (radios, in the depicted example), each including a clock-generator having: (1) a fundamental clock reference and an RF clock source that is, or is derived from, the fundamental clock reference; (2) one or more modules for determining at least some of first set of measurement that include RF code phase, code phase rate of change and code round-trip time-of-flight, RF carrier phase and carrier phase rate of change and carrier round-trip time-of-flight for a signal transmitted between the radios; (3) a clock-control module that includes a control filter for steering and/or controlling a clock source based on at least some of the first set of measurements; (4) a module for calibrating and/or compensating for RF measurement inaccuracy due to temperature and one or more gain settings in the signal path of the radios; and (5) computational resources to enable a high measurement rate to enable rapid synchronization, capture the dynamics, and accommodate changes due to environmental stimuli such as temperature, etc.

In some illustrative embodiments, a system according to aspects of the present disclosure advantageously includes at least one mobile platform that is other than a radio.

An illustrative method for synchronizing the clocks of a plurality of mobile platforms according to aspects of the present disclosure includes operations comprising: (1) making a plurality of measurements of round-trip transactions between a pair of radios; (2) from each measurement, determining the number of elapsed baseband clock cycles, the code and carrier phase, and the code- and carrier phase slopes for each radio; (3) estimating relative frequency and phase offsets between the clocks on the respective radios; (5) computing a baseband frequency offset measurement between the radios based on the carrier frequency offset; (5) computing fractional baseband offset (phase offset) between the clocks on the respective radios; (6) applying a filter to fuse the baseband frequency offset and fractional baseband offset to (i) remove bias in the baseband frequency offset and (ii) provide improved estimates of the clocks' baseband frequency offset and fractional baseband offset relative to one another; and (7) control and/or steer a clock frequency and phase on one of the respective radios through direct digital synthesis (DDS).

Notably, methods according to aspects of the present disclosure advantageously require as few as one round-trip transaction to generate all required measurements and begin synchronization, may be implemented using commonly available radio hardware, and are substantially resistant to radio frequency concerns, such as multi-path and channel effects.

In some illustrative embodiments, time, and clock references on at least one mobile platform is/are synchronized to an absolute time/frequency reference, such as a Universal Coordinated Time (UTC) reference.

In further illustrative embodiments according to aspects of the present disclosure, clock control may be accomplished using a control filter which may utilize some combination of the above measurements. The control filter may steer or control an oscillator, a Direct Digital Synthesis (DDS) device, a Numerically Controlled Oscillator (NCO), a fractional counter, or a similar device to generate a synchronized clock signal, timing source, or timing reference signal.

Note further that observations from the TCR are measured independently for each measurement transaction. Because these are very rapid measurements—with hundreds of independent measurements per second being possible—techniques according to aspects of the present disclosure are capable of measuring and controlling for rapid changes in the relationship between the fundamental clocks on TCR devices. As will be appreciated by those skilled in the art, such rapid changes can be due to environmental effects, motion, or low-performance reference clock hardware. Because synchronization techniques according to aspects of the present disclosure advantageously accommodates these effects, it allows synchronization of systems in environments that previously would have been impossible or required expensive, exotic hardware/software components and significant integration time before synchronization was achieved.

Still further, we note that illustrative embodiments according to aspects of the present disclosure exhibit significant advantages over prior-art synchronization systems, methods, and structures including—but not limited to:
  a) no need for cabling between remote platforms; or
  b) shorter periods of measurement before synchronization can be achieved; or
  c) expensive, high-quality clocks and other components are not required; or
  d) no need of fore-knowledge for separately measured position and/or distance between platforms; or
  e) no need for high signal-to-noise ratio (SNR) communications between platforms; or
  f) any combination of a, b, c, d, and e.

Finally, we note that illustrative embodiments according to aspects of the present disclosure provide two-way, direct measurement of phase and frequency offsets better than state-of-the-art direct measurements of observables needed to remotely synchronize clocks. Therefore, systems, methods, and structures according to aspects of the present disclosure overcome limitations of prior-art implementations, and our positioning, navigation and timing (PNT) techniques disclosed herein enable more accurate clock synchronization on less-expensive hardware for a wider range of applications than prior-art approaches.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above, and other aspects of the present disclosure described herein are illustrated by way of example(s) and not limited in the accompanying drawing.

BRIEF DESCRIPTION OF THE DRAWING

A more complete understanding of the present disclosure may be realized by reference to the accompanying drawing in which:

FIG. 23 shows a flow diagram of an illustrative single cycle frequency and phase steering/synchronization between Originator (slave) and Transponder (master) according to aspects of the present disclosure.

Figure 1:
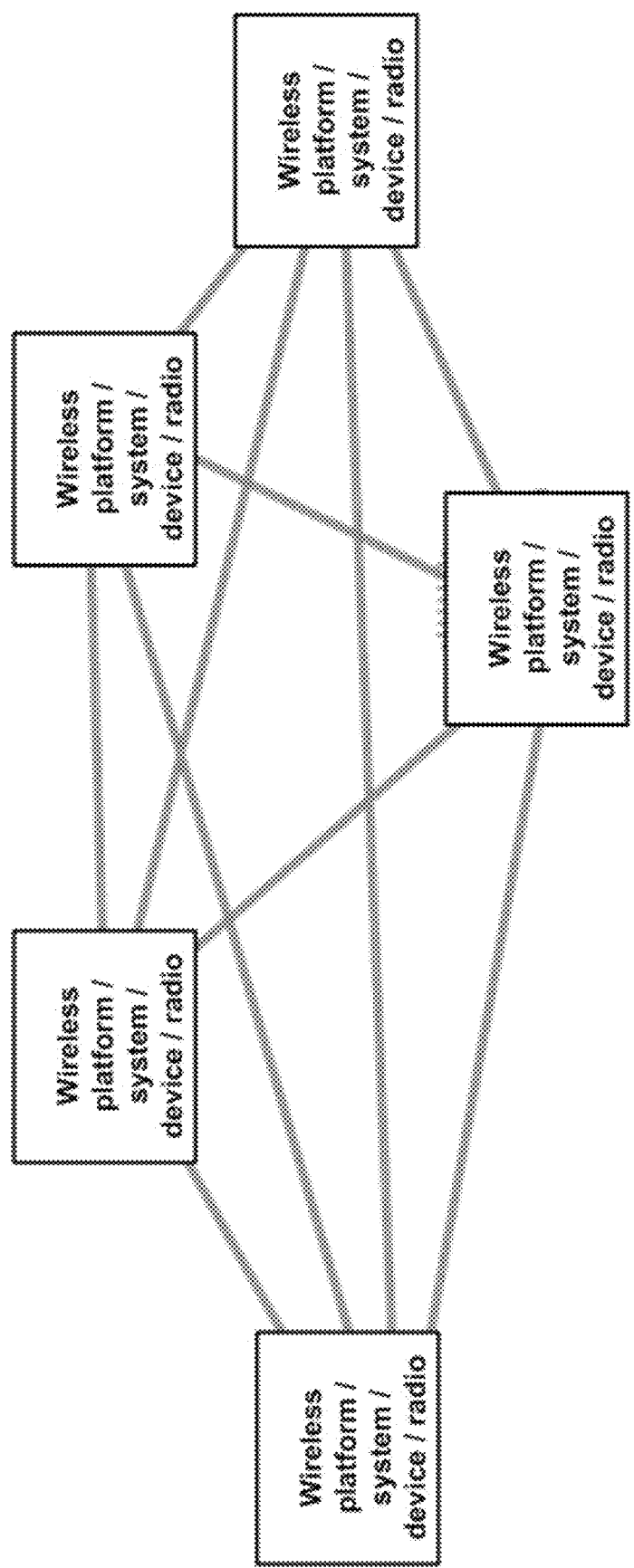
FIG. 1 is a schematic block diagram of an illustrative distributed network of wireless platforms/systems/devices/radios exhibiting time/frequency synchronization according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

At this point we note that to synchronize two clocks, measurements must be made that relate the phase and frequency offset of the clocks relative to one another, and a clock control filter and hardware and/or software must be in place to "steer" a remote clock's frequency and phase to a master clock's frequency and phase.

FIG. 1 is a schematic block diagram of an illustrative distributed network of wireless platforms/systems/devices/ radios exhibiting time/frequency synchronization according to aspects of the present disclosure. Operationally, wireless clock offset measurements are made between a pair—or more—of the distributed wireless platforms as shown in the figure and clock dynamics are controlled such that frequency, phase, and time of the multiple distributed, wireless clocks in each platform are synchronized. Regardless of specific topology or arrangement of platforms comprising a distributed network, any architecture according to aspects of the present disclosure may advantageously provide the wireless synchronization and syntonization of the phase and frequency of a remote clock to a local master clock; and/or wireless synchronization of time and clock reference on distributed radios to an absolute time/frequency reference such as a Universal Coordinated Time (UTC) reference.

TCR Measurements Used for Time and Frequency Synchronization

Round Trip Time-of-Flight

Baseband Range is an estimated one-way distance between communicating TCR devices obtained using the round-trip propagation time scaled by the speed of light in the medium and divided by two. After a calibration is performed for the fixed system delay, Baseband Range provides an unambiguous measurement of time-of-flight/distance between the TCR devices.

Carrier Phase Range (CPR) is measured on the Originator and Transponder on receive in the carrier recovery process (I/Q angle). Round trip carrier phase varies linearly with distance, and the round-trip transaction removes launch phase uncertainty, making CPR a precise measure of distance.

Code Phase Slope

Code phase slope is the measure of baseband frequency offset obtained by tracking the rate of change of relative alignment of DSSS correlator output pulses generated during round-trip transactions between cooperating TCR devices. This is a coarse measurement that may not be adequate for high-quality frequency offset measurement and control for synchronization between communicating platforms.

Code Phase Offset

Code phase offset is the measure of the relative phase alignment of the baseband processor clocks, obtained by calculating the difference of the measured shape and relative alignment of DSSS correlator output pulses generated during round-trip transactions of communicating TCR platforms.

Carrier Phase Slope

Carrier phase slope is the measure of the slope of the unwrapped carrier phase extracted during the preamble and data (with data wipe off) when receiving the transmission of a wirelessly communicating TCR device. This carrier phase slope is a linear combination of clock offsets and Doppler velocity between communicating TCR platforms.

Carrier Phase Offset

Carrier phase offset is the measure of the relative phase alignment or the carrier local oscillator (LO), between communicating TCR platforms.

Relationship of Measured Carrier Frequency Offset to Baseband Frequency Offset To accurately measure and control frequency offsets between communicating TCR platforms, an accurate estimate of the baseband frequency offset is required. The Code Phase Slope measurement does not have the accuracy or precision necessary for some high-performance applications, and so the more accurate Carrier Phase Slope measurements must be used instead. It is desirable then, to be able to represent the baseband frequency offset by using the measured carrier phase slope instead of the code phase slope. Derived below is a method for using carrier phase slope observations to determine the baseband frequency offset with higher precision than the direct measurement of code phase slope.

Reference oscillator (for example a TCXO, or VCTCXO), baseband clock frequency, and RF local oscillator frequencies are defined for TCR devices using the "Originator" and "Transponder" radio terminology, wherein $f_{osc_O}$ and $f_{osc_T}$ are reference oscillators on the Originator and Transponder radios respectively, $$\delta_{f_{osc_O}} \text{ and } \delta_{f_{osc_T}}$$

are their frequency offsets from the nominal reference oscillator frequency, respectively.

Note that $$\delta_{f_{osc_O}} \text{ and } \delta_{f_{osc_T}}$$

are typically bounded by their rated frequency accuracy in parts-per-million (ppm) of the reference oscillator, and is oftentimes around 5 ppm or lower on the TCR devices. Since these terms are not directly observed in the current measurement architecture, they are assumed to be zero in most cases for TCR measurement calculations.

The reference oscillator frequencies are represented in the following equations:

$$f_{osc_O} = f_{osc} + \delta_{f_{osc_O}} \quad [1]$$

$$f_{osc_T} = f_{osc} + \delta_{f_{osc_T}} \quad [2]$$

$f_{O_{RF}}$ and $f_{T_{RF}}$ are the RF carrier frequencies scaled by $\alpha_{RF}$ and $\alpha_{RF}(1+\delta_{\alpha_{RF}})$, respectively. The frequency tuning words for Originator and Transponder at each RF center frequency on the integrated transceiver set $\alpha_{RF}$ and $\alpha_{RF}(1+\delta_{\alpha_{RF}})$, respectively.

In some cases, depending on the specific clock generation scheme, the $\delta_{\alpha_{RF}}$ term is significant and cannot be assumed to be zero. In other cases, $\delta_{\alpha_{RF}}$ can be quite large if the reference oscillator frequency is different between the two communicating TCR devices.

$$f_{O_{RF}} = \alpha_{RF} f_{osc_O} \quad [3]$$

$$f_{T_{RF}} \alpha_{RF}(1+\delta_{\alpha_{RF}}) f_{osc_T} \quad [4]$$

$f_{O_{BB}}$ and $f_{T_{BB}}$ are the baseband frequencies scaled by $\alpha_{BB}$ and $\alpha_{BB}(1+\delta_{\alpha_{BB}})$ for the originator and transponder radios, respectively. The DDS tuning words for the baseband reference clock set $\alpha_{BB}$ and $\alpha_{BB}(1+\delta_{\alpha_{BB}})$, respectively.

On platforms where there is no digital synthesis for baseband reference clocks, the $\alpha_{BB}(1+\delta_{\alpha_{BB}})=1$ and $$\delta_{\alpha_{BB}} = \frac{1}{\alpha_{BB}} - 1. \tag{10}$$

$$f_{O_{BB}} = \alpha_{BB} f_{osc_O} \tag{5}$$

$$f_{T_{BB}} = \alpha_{BB}(1+\delta_{\alpha_{BB}}) f_{osc_T} \tag{6}$$

The carrier frequency offset measurement (computed from the round-trip carrier phase slope, or by other means) is defined by the following:

$$\Delta f_{RF} = f_{O_{RF}} - f_{T_{RF}} \tag{20}$$

$$\Delta f_{RF} = \alpha_{RF} f_{osc_O} - \alpha_{RF}(1+\delta_{\alpha_{RF}}) f_{osc_T} \tag{7}$$

which can be re-arranged to the following:

$$\Delta f_{RF} = \alpha_{RF}\left(\frac{f_{O_{BB}}}{\alpha_{BB}}\right) - \alpha_{RF}(1+\delta_{\alpha_{RF}})\left(\frac{f_{T_{BB}}}{\alpha_{BB}(1+\delta_{\alpha_{BB}})}\right) \tag{8}$$

$$\Delta f_{RF} = f_{O_{BB}}\left(\frac{\alpha_{RF}}{\alpha_{BB}}\right) - f_{T_{BB}}\left(\frac{\alpha_{RF}(1+\delta_{\alpha_{RF}})}{\alpha_{BB}(1+\delta_{\alpha_{BB}})}\right) \tag{9}$$

It is desirable to represent the baseband radio frequency offset as a function of the measured carrier frequency offset and system parameters. This can be represented as:

$$\Delta f_{BB} = f_{O_{BB}} - f_{T_{BB}} \tag{10}$$

which can be expressed for the transponder's baseband reference frequency, $$f_{T_{BB}} = f_{O_{BB}} - \Delta f_{BB} \tag{11}$$

and substituted into Equation 9, giving the following:

$$\Delta f_{RF} = f_{O_{BB}}\left(\frac{\alpha_{RF}}{\alpha_{BB}}\right) - (f_{O_{BB}} - \Delta f_{BB})\left(\frac{\alpha_{RF}(1+\delta_{\alpha_{RF}})}{\alpha_{BB}(1+\delta_{\alpha_{BB}})}\right) \tag{12}$$

To simplify the ratio terms, which are all known constants, the following constants are defined:

$$A = \frac{\alpha_{RF}}{\alpha_{BB}} \tag{13}$$

$$B = \frac{\alpha_{RF}(1+\delta_{\alpha_{RF}})}{\alpha_{BB}(1+\delta_{\alpha_{BB}})} = A\frac{1+\delta_{\alpha_{RF}}}{1+\delta_{\alpha_{BB}}} \tag{14}$$

$$C = \frac{A}{B} = \frac{1+\delta_{\alpha_{BB}}}{1+\delta_{\alpha_{RF}}} \tag{15}$$

The physical interpretation of A is the approximate scale factor between baseband and RF local oscillator frequencies. This can be interpreted as a "processing gain". The physical interpretation of B the precise relationship between baseband and RF local oscillator frequencies accounting for differences in frequency tuning words. The physical interpretation of C=A/B is the ratio of approximate to precise frequency scale factors. These constants are substituted into Equation 12, which gives a new equation, $$\Delta f_{RF} = A \cdot f_{O_{BB}} - B \cdot f_{O_{BB}} + B \cdot \Delta f_{BB} \tag{16}$$

This can then be rearranged to isolate the baseband frequency offset.

$$\Delta f_{BB} = \frac{\Delta f_{RF}}{B} - f_{O_{BB}}\left(\frac{A-B}{B}\right) \tag{17}$$

$$\Delta f_{BB} = \frac{\Delta f_{RF}}{B} + f_{O_{BB}}(1-C)$$

$$\Delta f_{BB} = \Delta f_{RF}\left[\frac{\alpha_{BB}(1+\delta_{\alpha_{BB}})}{\alpha_{RF}(1+\delta_{\alpha_{RF}})}\right] + f_{O_{BB}}\left(1 - \frac{1+\delta_{\alpha_{BB}}}{1+\delta_{\alpha_{RF}}}\right) \tag{18}$$

Time Offset Measurement

To synchronize time between TCR devices, a time offset of the current timebases must be calculated. This time offset can be determined using the round-trip measurement observable from the frequency offset measurement, baseband range measurement, and time values from the Originator and Transponder TCR devices sampled when the synchronization word arrives.

Master clock cycles elapsed between synchronization word events on the Originator and Transponder TCR devices ($Mcnt_O$, $Mcnt_T$) are described in detail in U.S. Pat. No. 8,199,047, which is incorporated herein by reference as if set forth at length. Additional details and information relating to certain other determined and/or measured values employed in our systems and methods according to aspects of the present disclosure are described in U.S. Pat. No. 9,271,258 which is incorporated herein by reference as if set forth at length.

Finer resolution propagation times are achieved by estimating the peak error, or how far the sampled DSSS correlator peak is from the unknown real peak in terms of fractional clock cycle. This peak error on Originator and Transponder, $\phi_O$ and $\phi_T$, and its calculation are described U.S. Pat. No. 8,199,047 which is incorporated herein by reference as if set forth at length. Those parameters, together with the measured baseband frequency offset are used to calculate an improved propagation time according to the following:

$$t_{prop} = \frac{1}{f_{O_{BB}}}(Mcnt_O - \phi_O) - \frac{1}{f_{O_{BB}} - \Delta f_{BB}}(Mcnt_T - \phi_T) \tag{19}$$

A time correction is then calculated using the same measurement observables to align the sampled time on the Transponder TCR to the timebase of the Originator TCR according to the following:

$$t_{correction} = \frac{\phi_T}{f_{O_{BB}} + \Delta f_{BB}} + t_{prop} \tag{20}$$

Finally, a time offset between the two TCR platforms can be calculated using the time correction and times from each TCR sampled at the receipt of the synchronization word according to the following:

$$t_{offset} = t_T - t_{correction} - t_O \tag{21}$$

Phase Offset Measurement

Estimated peak error on the Originator and Transponder TCR devices can be used to calculate the relative phase offset between master clock references on each device. This calculation, shown below, can be wrapped and unwrapped appropriately to represent the phase offset covering one whole clock domain.

$$\Delta\phi = \frac{\phi_O - \phi_T}{2} \qquad [22]$$

System Clock and Time Reference Architectures Supporting Synchronization

Timestamp Generator/Counter/Fractional Counter for Time Reference

Controllable timestamp generators and similarly Numerically Controlled Oscillators (NCO), may be used to enable time synchronization between Master Element TCRs and Synchronized Element TCRs be adjusting the digital numerical control of their time offset and counter period per clock cycle so that each platform counts time uniformly, even if their reference clock frequencies vary or are different.

Figure 2:
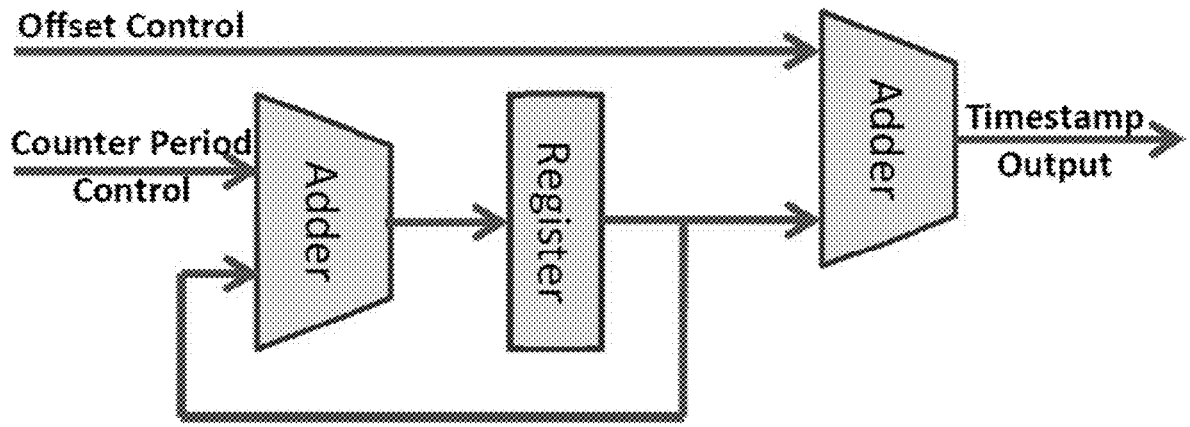
FIG. 2 is a schematic block diagram of an illustrative timestamp generator/counter/fractional counter for time reference for providing system clock and time reference synchronization according to aspects of the present disclosure.

FIG. 2 is a schematic block diagram of an illustrative timestamp generator/counter/fractional counter for time reference for providing system clock and time reference synchronization according to aspects of the present disclosure.

Independent control of the counter period and offset allows this type of counter architecture to maintain the same time as a counter on a separate, or different platform, even if their fundamental reference sources are different or not synchronized.

Frequency Reference Generation With Direct Digital

Direct Digital synthesis enables the generation of an agile (i.e. immediately or fast responding) frequency source with adjustable phase, low phase noise, and low spurious performance. Modern DDS systems achieve up to micro-hertz frequency resolutions and sub-degree phase tuning capabilities. The digital architecture also provides fixed synthesis relationships that do not vary over time or temperature like analog synthesizer topologies that may see frequency and phase drift over time due to component aging or temperature variations.

Figure 3:
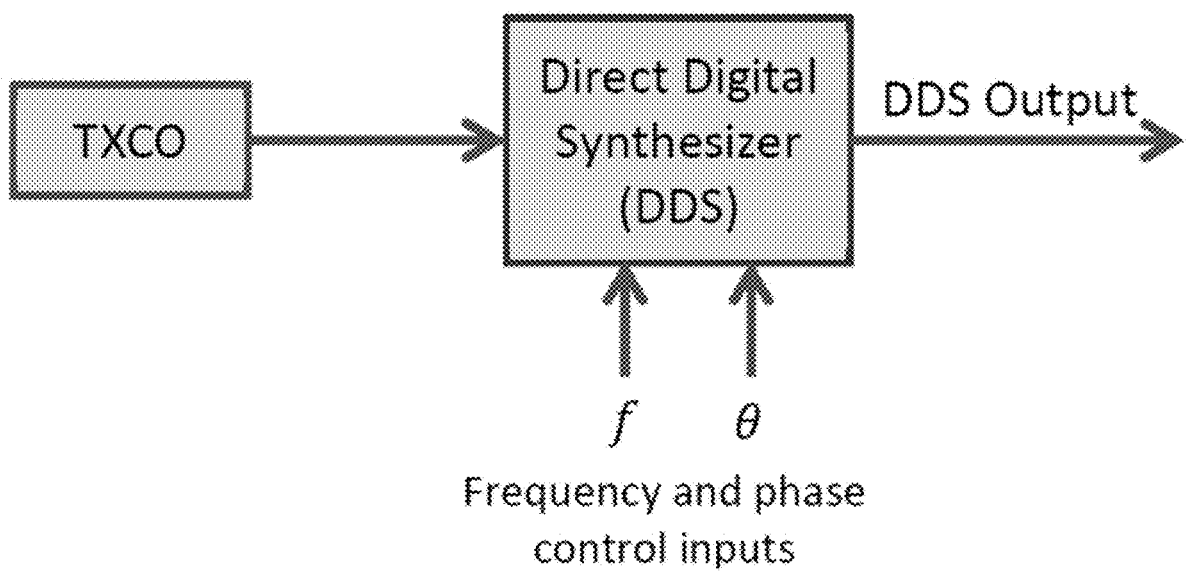
FIG. 3 is a schematic block diagram of an illustrative frequency reference generator for providing system clock and time reference synchronization according to aspects of the present disclosure.

FIG. 3 is a schematic block diagram of an illustrative frequency reference generator for providing system clock and time reference synchronization according to aspects of the present disclosure.

The phase relationship of some single DDS systems can be directly controlled, enabling precise relative synchronization of multiple systems to a known phase or common reference point. With continuous phase offset measurements and time offset measurements between communicating TCR platforms, a coherent phase relationship can be created and maintained between DDS systems on each platform.

Voltage Controlled Oscillator, Phase Locked Loop, and Fractional-N Synthesis

A voltage-controlled oscillator is an oscillator which provides the ability to control the oscillation frequency according to an analog voltage input. These are often implemented as crystal oscillators with a narrow frequency tuning range controlled by an input voltage, providing an ability to adjust and synchronize its output frequency to another frequency reference source.

Figure 4:
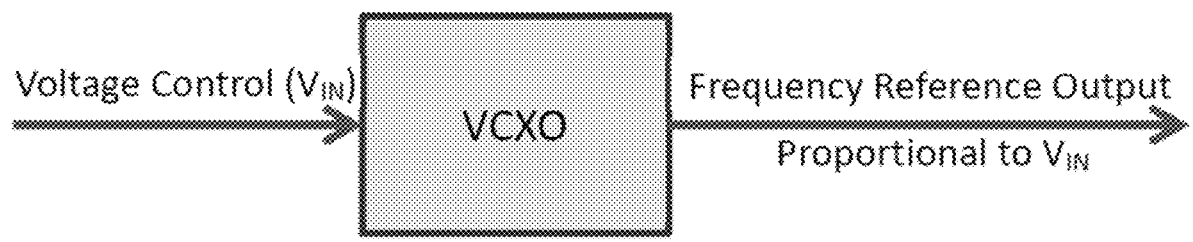
FIG. 4 is a schematic block diagram of an illustrative voltage-controlled oscillator for providing system clock and time reference synchronization according to aspects of the present disclosure.

FIG. 4 is a schematic block diagram of an illustrative voltage controlled oscillator for providing system clock and time reference synchronization according to aspects of the present disclosure.

Those skilled in the art will understand and appreciate that voltage controlled oscillators are commonly found in phase locked loop, integer-N, and fractional-N synthesis circuits, which provide the ability to generate agile frequency sources with fine frequency resolution and good signal performance. A phase locked loop is a feedback loop that drives the phase of a generated signal to follow that of a reference signal. Frequencies synthesized can be created using integer-N or fractional-N synthesis. Integer synthesis architectures require that the output frequency is an integer multiple or ratio of the reference, where with fractional-N synthesis architectures the divider supports fractional division ratios rather than just integer. In both cases, the ratio values are programmable and can be digitally controlled, enabling remote synchronization of frequency references of distributed platforms.

Control Architectures for Clock and Time References

In time metrology, steering a clock includes minimizing its deviation in phase and frequency with respect to a reference clock. A simple steering process can be implemented as a closed-loop feedback system with independent control inputs for both frequency and phase. In a state-space representation, the state of the system x includes both the relative phase difference and the rate of change of the phase difference referenced to the DDS output frequency reference between two transacting TCR devices as shown in Equation 23.

$$x = \begin{bmatrix} \theta \\ \dot{\theta} \end{bmatrix} \qquad [23]$$

Round-trip measurements provide direct observations of the relative phase and frequency offset between TCR devices. The measurement z in state-space form for the implemented TCR system is shown in Equation 24.

$$z = \begin{bmatrix} 1 & 0 \\ 0 & 1 \end{bmatrix} x \qquad [24]$$

Finally, the overall system in state-space form is shown in Equation 25 and 26. With each phase and/or frequency offset measurement, both the frequency and phase deviation estimate are updated. Although the current system enables independent control of both phase and frequency based on the DDS inputs illustrated previously, a greater emphasis is placed on control of frequency and using the phase control solely for fine tuning.

$$x_{k+1} = \begin{bmatrix} 1 & dt \\ 0 & 1 \end{bmatrix} x_k + \begin{bmatrix} 1 & 0 \\ 0 & 1 \end{bmatrix} u_k \qquad [25]$$

$$u_k = x_k \qquad [26]$$

This "synchronization filter" performs both a measurement and a control update after every transactional observation, which can operate at hundreds of cycles per second.

This synchronization filter could likely be improved through the incorporation of clock error models and controller error models.

Virtual Phased Array Coherent Link Technology (CLT) IR&D System

One particular development platform—the ENSCO Espresso V3 TCR development platform—was used to create a demonstration system for wireless frequency, phase, and time synchronization. This system implements the RF measurements discussed above, using a 5.8 GHz DSSS communications waveform, to enable the Coherent Link Technology (CLT) operation. The TCR waveform specifications include:

5.8 GHz ISM band operation
 20 MHz Bandwidth Direct Sequence Spread Spectrum (DSSS) waveform
 1 ms packetized transmissions (2 ms for round-trip measurements)
 Maximum measurement rate>400 Hz
 1+ km operating distance with ISM compliant transmission The Espresso V3 hardware platform that implements the TCR system is a fully featured software defined radio that implements all required signal processing, reference signal generation, and synchronization control. Espresso V3 features include:

Zynq XC7Z045 System on Chip (SoC) which combines
 Dual-core ARM Cortex-A9 processing system
 Xilinx 7-series Kintex programmable logic
 On-chip memory and DDR3 memory interface (1 GB)
 Maxim MAX2851 5.8 GHz transceiver with 1 transmit and 5 receive channels, and external PA/LNAs
 Single channel transmit
 Multi-channel receive
 28 dBm transmit power
 Reference clock signal generation
 TCXO frequency reference
 Direct digital synthesis baseband processor and data converter clock generation
 44/40 MHz, 11/10 MHz, and 1-PPS reference signals
 Independent phase and frequency control
 Digitally synthesized RF local oscillator (LO)

Figure 5:
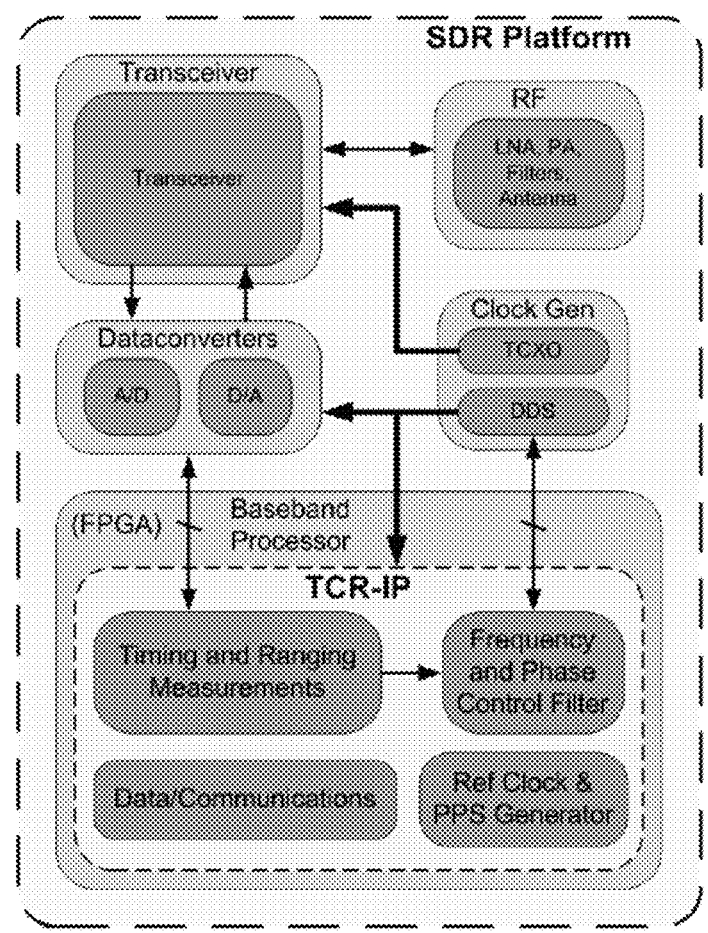
FIG. 5 is a schematic block diagram of an illustrative development platform and high-level architecture of implementation for providing system clock and time reference synchronization according to aspects of the present disclosure.

FIG. 5 is a schematic block diagram of an illustrative development platform (ENSCO Expresso V3) including high-level architecture of implementation for providing system clock and time reference synchronization according to aspects of the present disclosure.

Experimental Test Results

Figure 6:
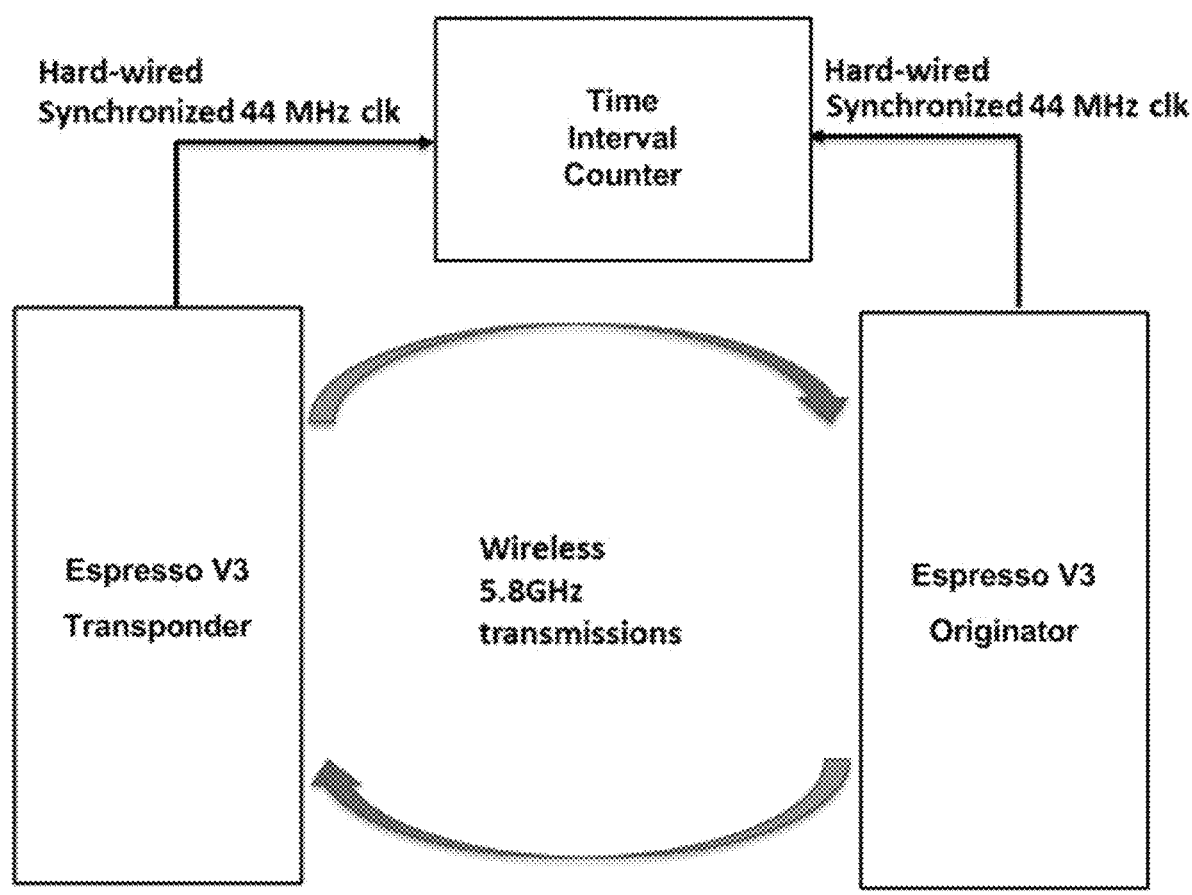
FIG. 6 is a photo-illustration of an illustrative experimental arrangement utilizing the development platform of FIG. 5 providing system clock and time reference synchronization according to aspects of the present disclosure.

As we shall now show and describe, our demonstration system achieved wireless frequency and phase synchronization, with support for mobile operations. FIG. 6 is a photo-illustration of an illustrative experimental arrangement utilizing the development platform of FIG. 5 providing system clock and time reference synchronization according to aspects of the present disclosure.

As may be observed from the figure, two Espresso V3 radios communicated wirelessly in a Transponder-Originator configuration. One TCR was configured as a Master Element, and the other as a Synchronized Element. The TCR measurements of round-trip time-of-flight, phase slopes and offsets were used to calculate the frequency, phase, and time offset between platforms, and the offsets used in a closed-loop control scheme to control the baseband processor DDS frequency and phase to achieve synchronization to the Master Element TCR. A time interval counter was used to measure the frequency and phase synchronization performance of the reference signals (44/40/11/10 MHz and 1-PPS) generated on the Master Element and Synchronized Element TCR devices.

Figure 7:
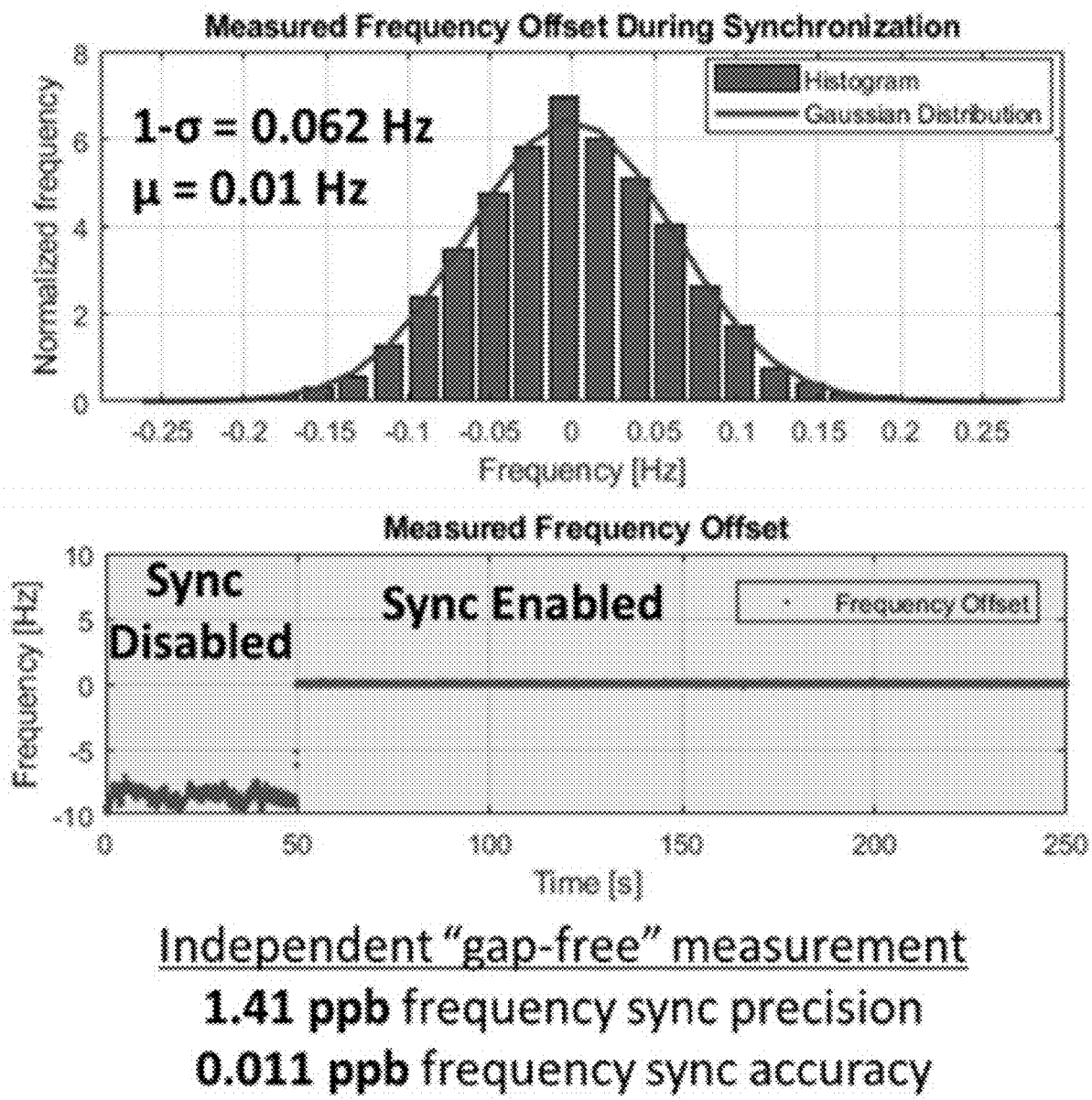
FIG. 7 shows a histogram plot of measured frequency offset during synchronization and a plot of measured frequency offset for an independent gap-free measurement illustrating 1.41 ppb frequency sync precision and 0.011 ppb frequency sync accuracy according to aspects of the present disclosure.

FIG. 7 shows a histogram plot of measured frequency offset during synchronization and a plot of measured frequency offset for an independent gap-free measurement illustrating 1.41 ppb frequency sync precision and 0.011 ppb frequency sync accuracy according to aspects of the present disclosure.

Figure 8:
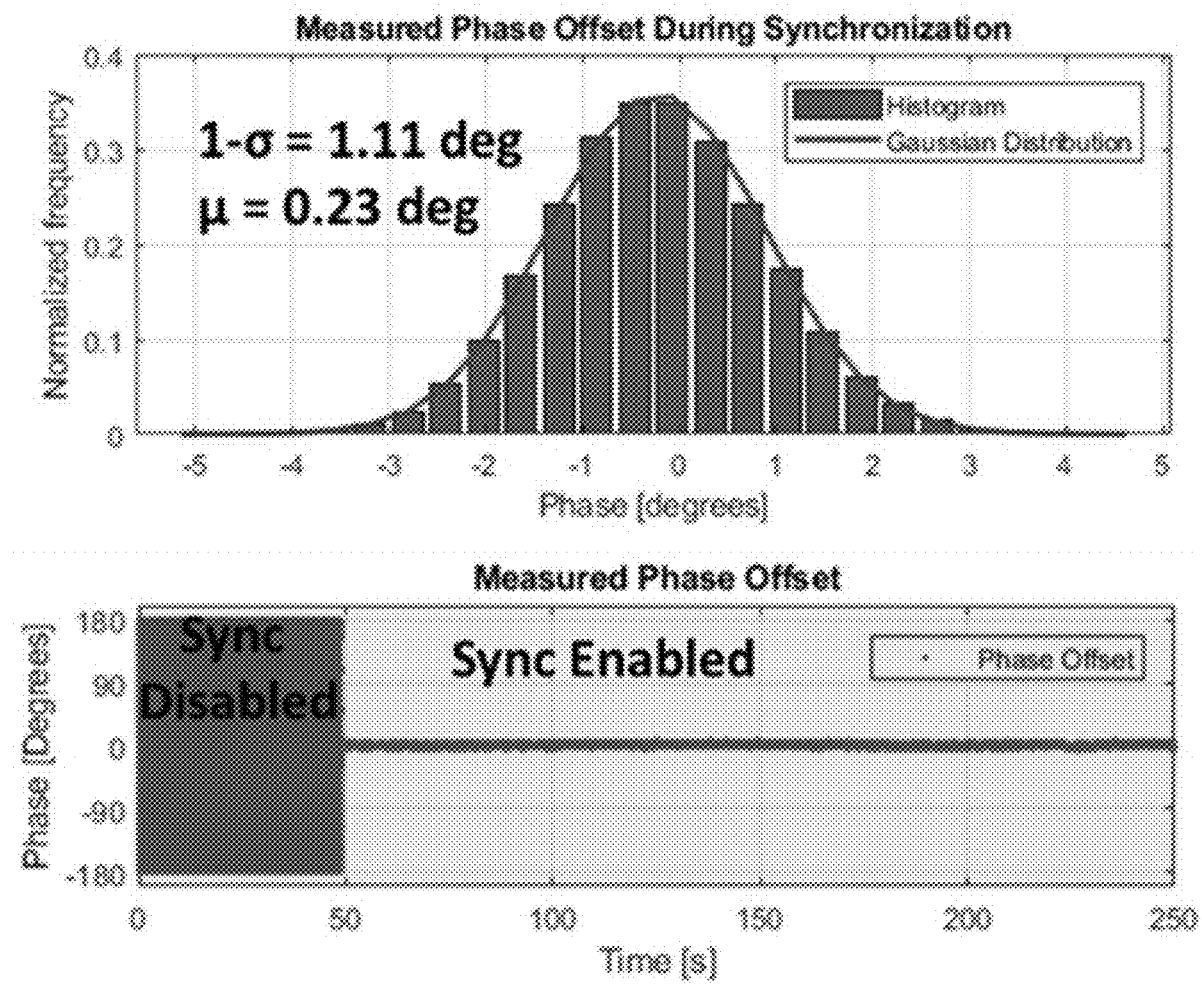
FIG. 8 shows a histogram plot of measured phase offset during synchronization and a plot of measured phase offset for an independent gap-free measurement illustrating 70.2 picosecond phase sync precision and 14.4 phase sync accuracy according to aspects of the present disclosure.

FIG. 8 shows a histogram plot of measured phase offset during synchronization and a plot of measured phase offset for an independent gap-free measurement illustrating 70.2 picosecond phase sync precision and 14.4 phase sync accuracy according to aspects of the present disclosure.

From the synchronization results shown in the figures, those skilled in the art will appreciate that synchronization is achieved near-instantaneously once synchronization was enabled at 50 seconds into the experiment. The synchronized frequency precision was 1.41 ppb and the synchronized phase precision was 70.2 picoseconds. Importantly, and according to aspects of the present disclosure, such synchronization may be achieved in only a single, round-trip set of exchanges between the transponder and originator.

We further tested the system by disseminating the synchronized reference signals to an external software radio system (Pentek Jade), to demonstrate distributed frequency and phase synchronization/coherence of an external device using the CLT reference signal outputs.

Figure 9:
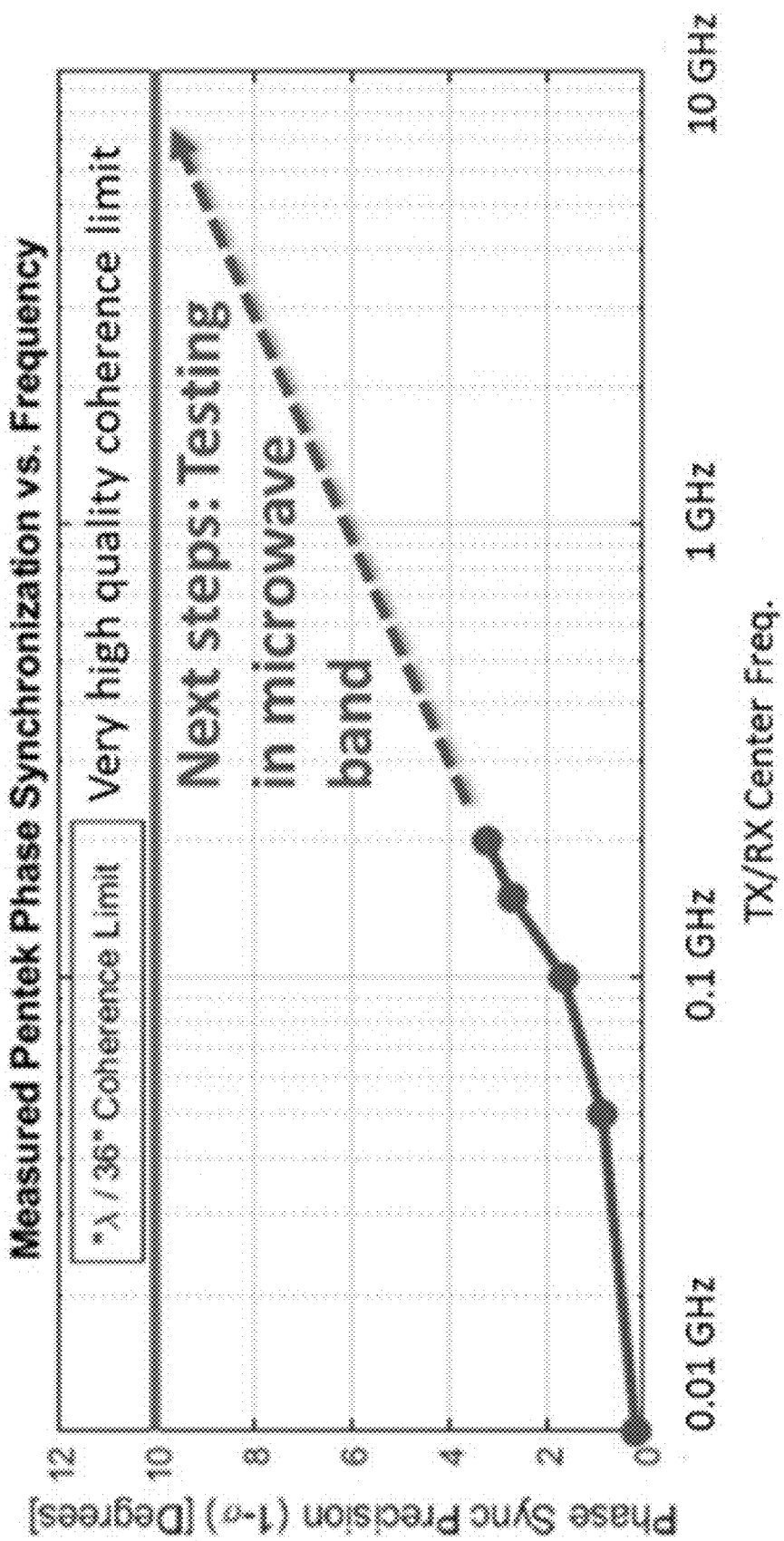
FIG. 9 shows a plot of measured phase synchronization vs. frequency for two radio systems wirelessly synchronized with 10 MHz and 1 PPS reference signals generated from SDRs with TCR-IP according to aspects of the present disclosure.
Figure 10:
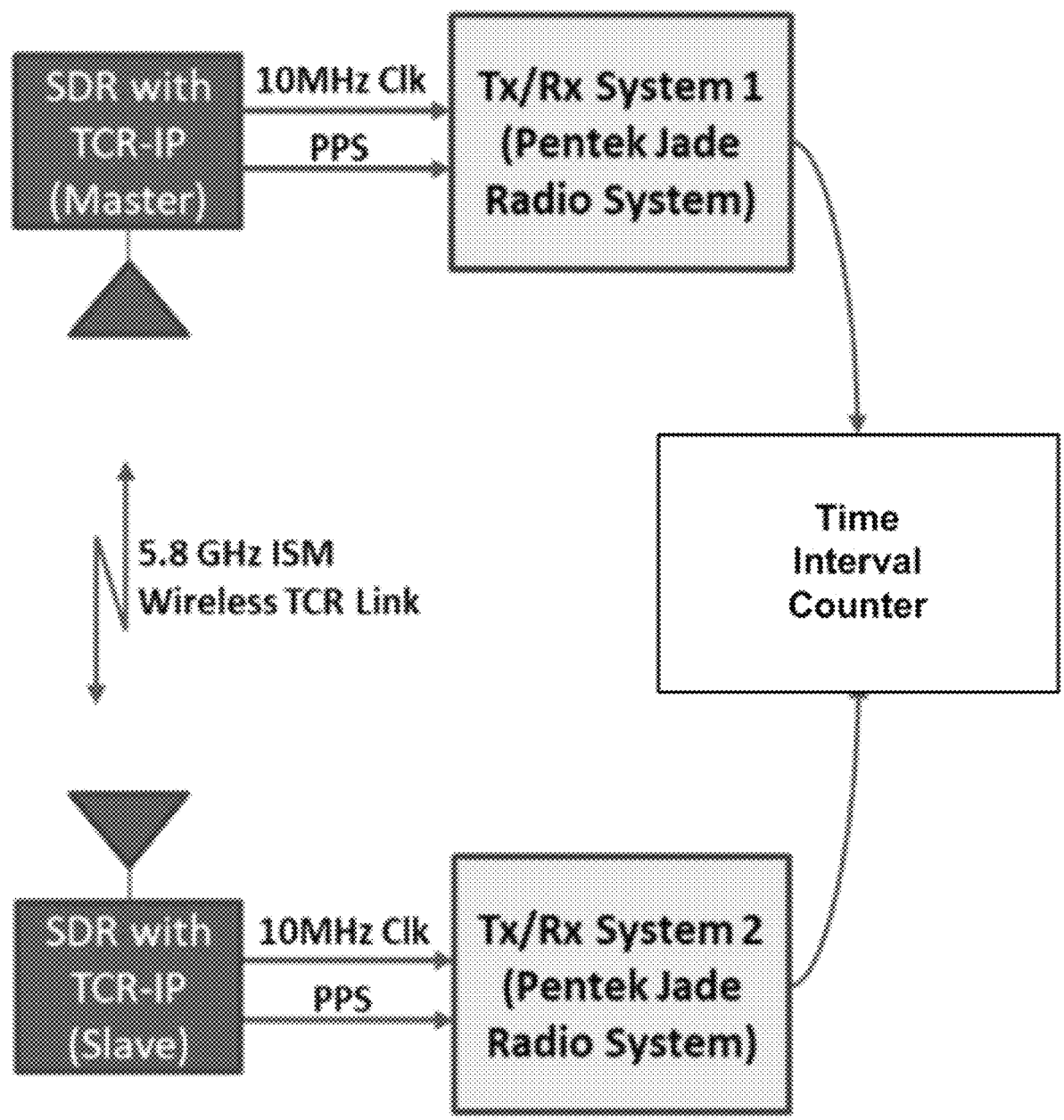
FIG. 10 shows a schematic block diagram of the wireless synchronization of the two radio systems of FIG. 9 according to aspects of the present disclosure.

FIG. 9 shows a plot of measured phase synchronization vs. frequency for two radio systems wirelessly synchronized with 10 MHz and 1 PPS reference signals generated from SDRs with TCR-IP according to aspects of the present disclosure; and FIG. 10 shows a schematic block diagram of the wireless synchronization of the two radio systems of FIG. 9 according to aspects of the present disclosure.

As may be observed from the figures, we show the relative phase error vs. a benchmark "lambda/36" (i.e., 360 deg/36=10 degrees relative phase difference standard deviation needed for tight coherency). Synchronization performance is well under this tight benchmark for the frequencies tested. For example, at 200 MHz the phase-error standard deviation is lambda/112 or 3.2 degrees phase standard deviation.

ENSCO CLT Wireless Clock Modem Development System

Using a more accurate ground truth clock that measures down to the femtosecond level, 0.88 ppb frequency-synchronization precision and 14 picosecond time-synchronization precision was demonstrated, based on a slightly improved signal processing implementation that included more effectively removing outliers and smoothing the raw measurements and calibration.

Figure 11:
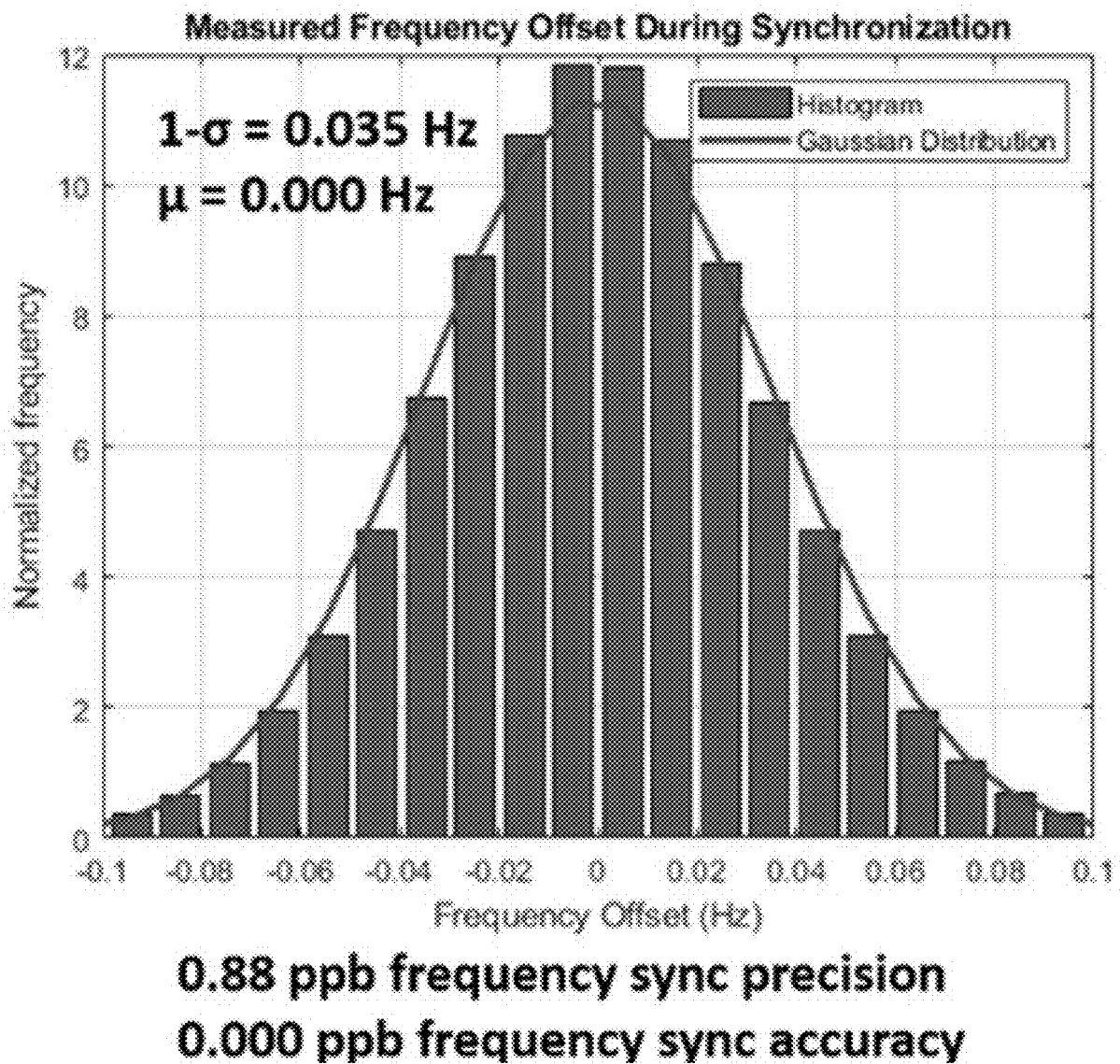
FIG. 11 shows a bar graph for the two radio systems of FIG. 6 of measured frequency offset during synchronization exhibiting 0.88 ppb frequency sync precision and 0.000 ppb frequency sync accuracy according to aspects of the present disclosure.
Figure 12:
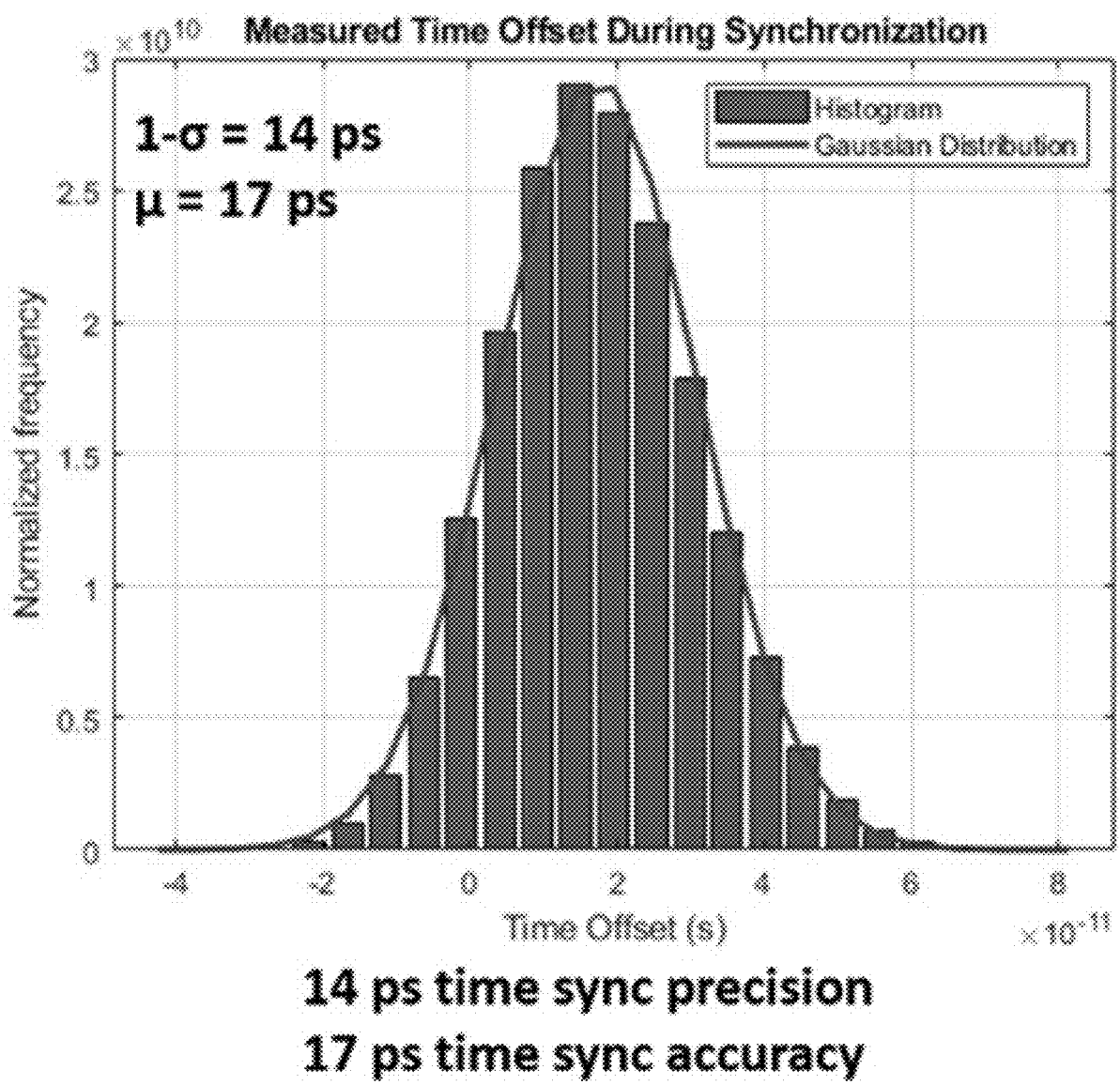
FIG. 12 shows a bar graph for the two radio systems of FIG. 6 of measured time offset during synchronization exhibiting 14 picosecond time sync precision and 17 picosecond time sync accuracy according to aspects of the present disclosure.

FIG. 11 shows a bar graph for the two radio systems of FIG. 6 of measured frequency offset during synchronization exhibiting 0.88 ppb frequency sync precision and 0.000 ppb frequency sync accuracy according to aspects of the present disclosure; and FIG. 12 shows a bar graph for the two radio systems of FIG. 6 of measured time offset during synchronization exhibiting 14 picosecond time sync precision and 17 picosecond time sync accuracy according to aspects of the present disclosure.

Figure 13:
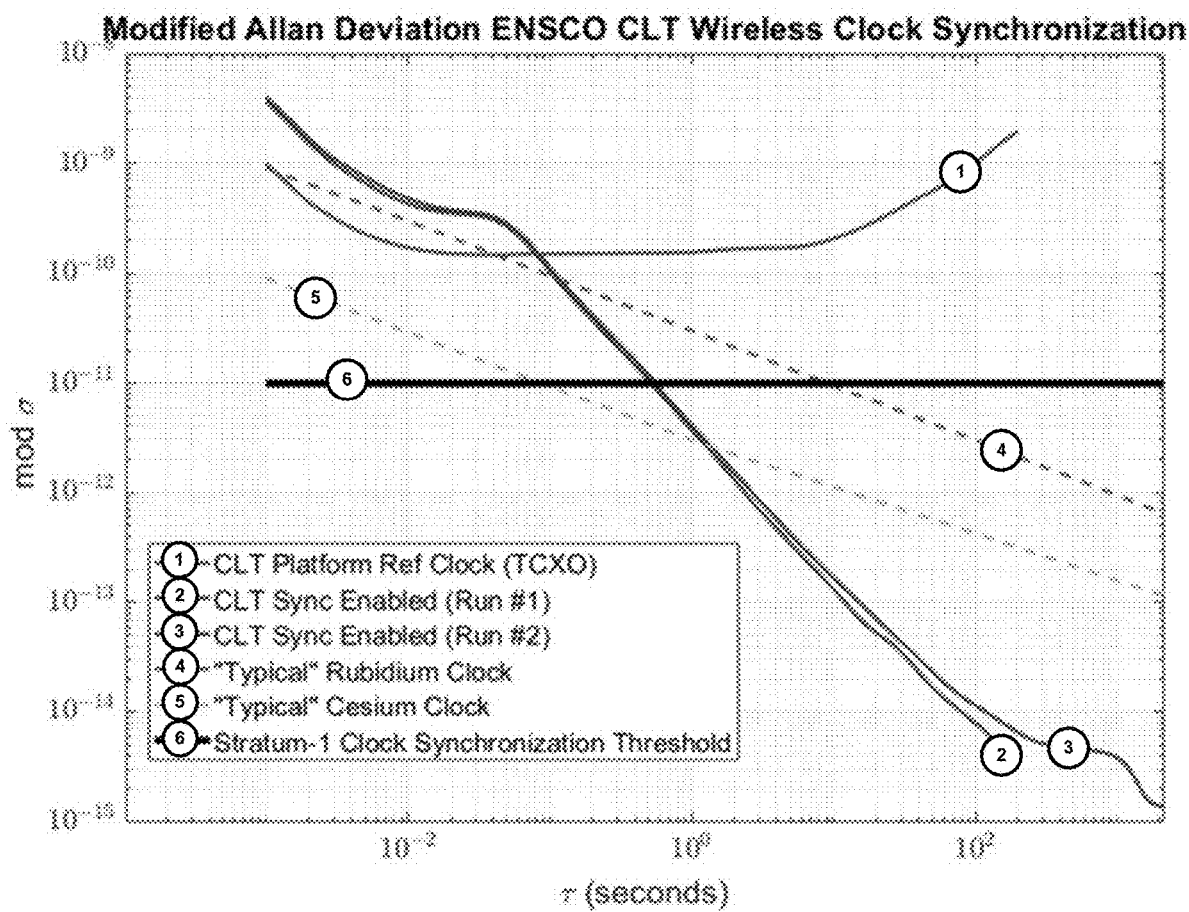
FIG. 13 shows a set of plots illustrating modified Allan deviation according to aspects of the present disclosure.
Figure 14:
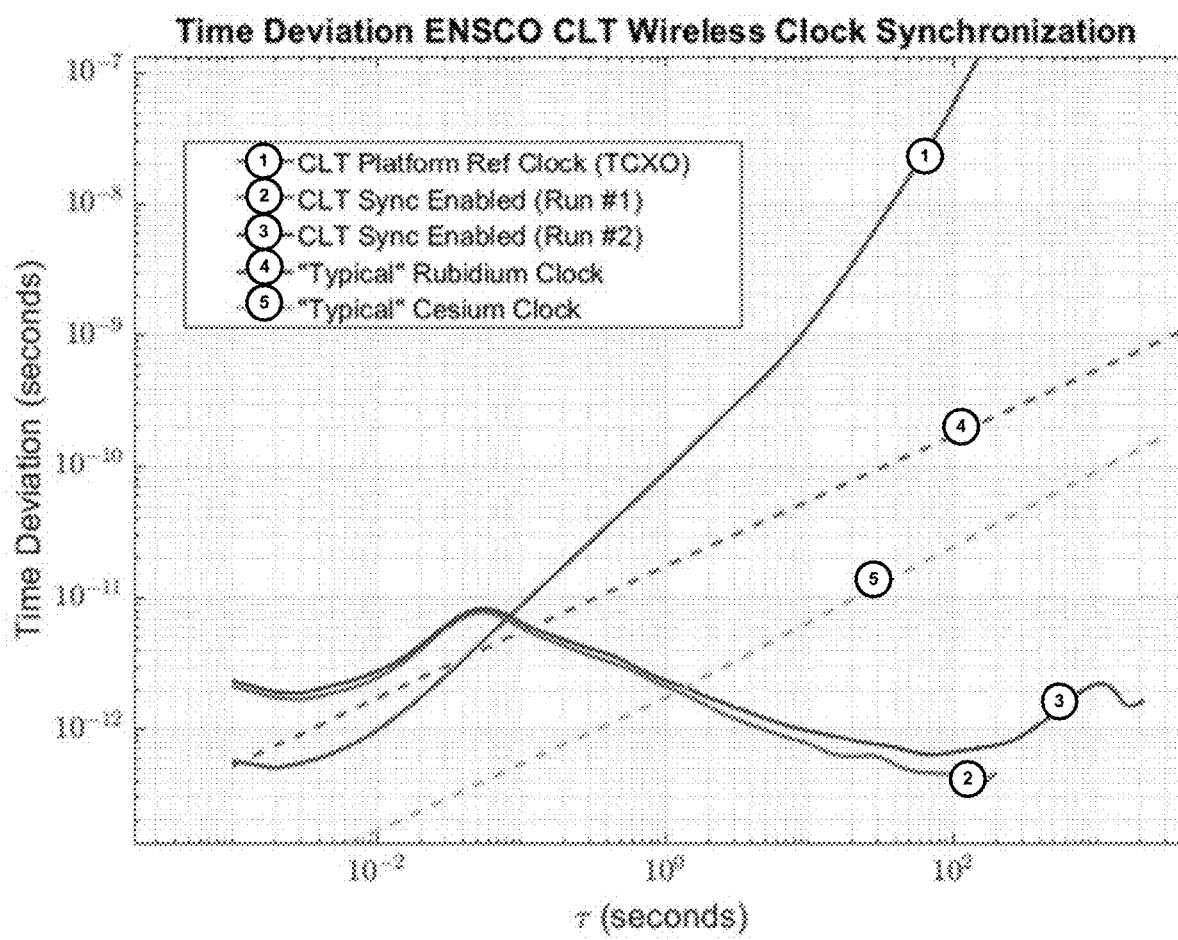
FIG. 14 shows a set of plots illustrating time deviation according to aspects of the present disclosure.

FIG. 13 shows a set of plots illustrating modified Allan deviation according to aspects of the present disclosure; and FIG. 14 shows a set of plots illustrating time deviation according to aspects of the present disclosure.

As may be observed in FIG. 13 and FIG. 14, both time deviation (TDEV) and modified Allan deviation (MDEV) plots are based on analysis of a single test collection without synchronization enabled and two collections with synchronization enabled. The MDEV plot shows that we can advantageously maintain a $1\times10^{-11}$ fractional frequency with calibration of and compensation for the systematic errors. The TDEV plot shows that we can maintain<10 picosecond level precision with calibration of and compensation for the systematic errors.

A reference clock source that relays UTC (Coordinated Universal Time) and has little or no delay is known as a stratum-0 device. The $1\times10^{-11}$ precision fractional frequency measured in the MDEV plot above based on this recent demonstration is the threshold required for a device to be classified as stratum-1 and synchronized by a stratum-0 clock, which suggests this system could be used as a wireless stratum-1 "clock modem" capable of distribution of stratum-0 reference clocks.

Time Synchronization Demonstration System

Wireless time synchronization was demonstrated using a TCR platform that implements RF measurements, as discussed above, using a 5.8 GHz DSSS communications waveform with the following specifications:

5.8 GHz ISM band operation
  20 MHz Bandwidth Direct Sequence Spread Spectrum (DSSS) waveform
  1 ms packetized transmissions (2 ms for round-trip measurements)
  Maximum measurement rate>400 Hz
  1+ km operating distance with ISM compliant transmission The TCR platform used is a software-defined radio capable of implementing all required signal processing, reference signal generation, and synchronization control, and which includes:

Xilinx XC7K325T Kintex-7 FPGA
  ARM Cortex-M4 microcontroller
  Maxim MAX2851 5.8 GHz transceiver with 1 transmit and 5 receive channels, and external PA/LNAs
  Single channel transmit
  Multi-channel receive
  22 dBm transmit power
  Reference clock signal generation
  TCXO frequency reference
  Direct digital synthesis baseband processor and data converter clock generation
  44/40 MHz, 11/10 MHz, and 1-PPS reference signals
  Independent phase and frequency control
  Digitally synthesized RF local oscillator (LO)

The TCR platform high-level architecture of the implementation was shown previously with respect to FIG. 5.

Experimental Test Results

The time synchronization demonstration system achieved wireless network time synchronization, including during platform motion and varying system motion dynamics. The time synchronization performance was independently measured using a time interval counter and a 2-radio synchronized network. The time interval counter received, and measured the offset between, 1-Pulse Per Second (1-PPS) pulses generated from each independent platform. This enabled very accurate and precise verification of synchronization performance between communicating TCR elements in the network. The test configuration is shown in the figure below.

For the experimental test, two TCR platform radios communicated wirelessly in a Transponder-Originator configuration. One TCR was configured as a Master Element, and the other as a Synchronized Element. The TCR measurements of round-trip time-of-flight, phase slopes and offsets were used to calculate the frequency, phase, and time offset between platforms, and the offsets used in a closed-loop control scheme to control the timestamp generator offset and counter period control inputs to achieve time synchronization to the Master Element TCR. The time interval counter was used to determine the accuracy and precision of the time synchronization by measuring the time offset between rising edges of the 1-PPS generated by each radio platform.

Figure 15:
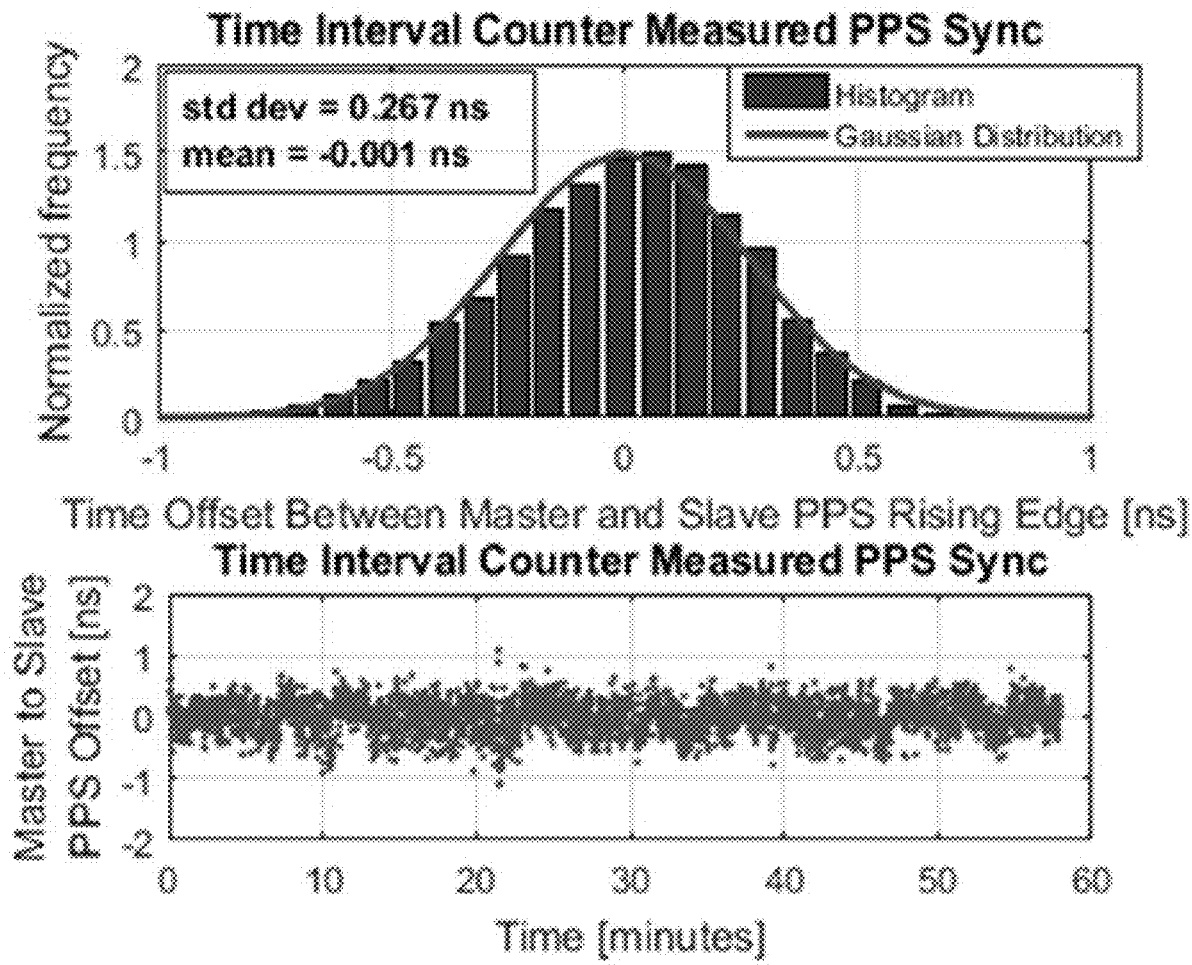
FIG. 15 shows a plot of time offset data independently reported for an illustrative synchronized system according to aspects of the present disclosure.

FIG. 15 shows a plot of time offset data independently reported for an illustrative synchronized system according to aspects of the present disclosure.

Figure 16:
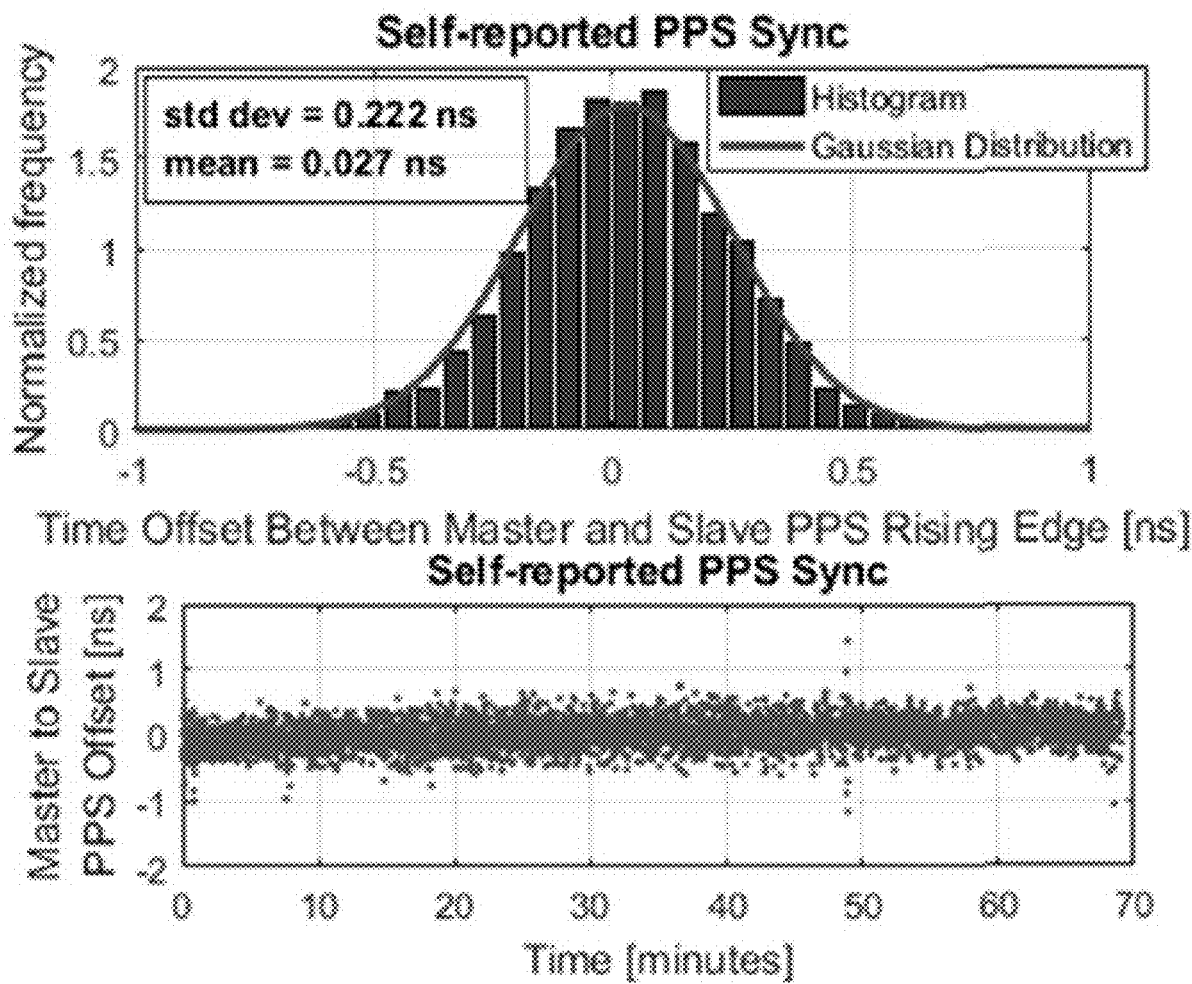
FIG. 16 shows a plot of time offset data self-reported for an illustrative synchronized system according to aspects of the present disclosure.

FIG. 16 shows a plot of time offset data self-reported for an illustrative synchronized system according to aspects of the present disclosure.

From these figures, it may be observed that synchronization performance is shown as both self-reported TCR-estimated synchronization performance and as an independently measured value from the time interval counter. The two methods of measurement closely agree with each other and indicate a time synchronization performance was achieved approaching 0.25 ns precision and zero-mean accuracy between the two platforms.

Synchronization according to aspects of the present disclosure was also demonstrated using a different scenario that included a larger network of synchronized element TCR devices, some mobile and some fixed in their placement. The mobile TCR devices were handheld and were carried around the field while performing the ranging measurements and time synchronization.

Figure 17:
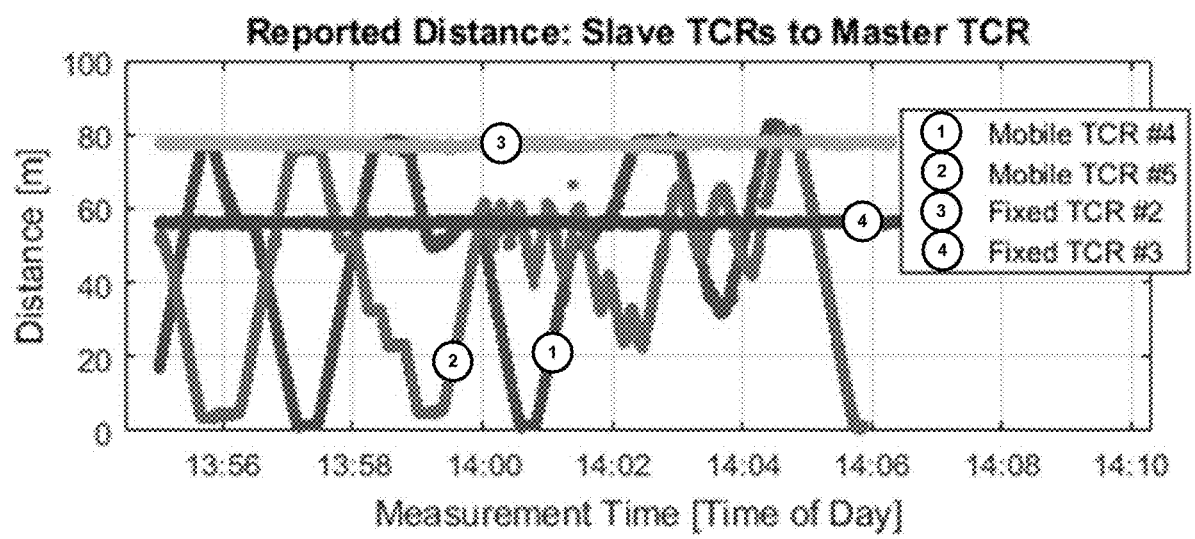
FIG. 17 shows a plot displaying inter-platform range measured from a Master TCR device and a Synchronized Element TCR device(s) according to aspects of the present disclosure.

FIG. 17 shows a plot displaying inter-platform range measured from a Master TCR device and a Synchronized Element TCR device(s) according to aspects of the present disclosure.

As may be observed from the results shown in these figures, one can see that TCR #2 and TCR #3 are stationary, while TCR #4 and TCR #5 are in motion for the duration of the test.

Figure 18:
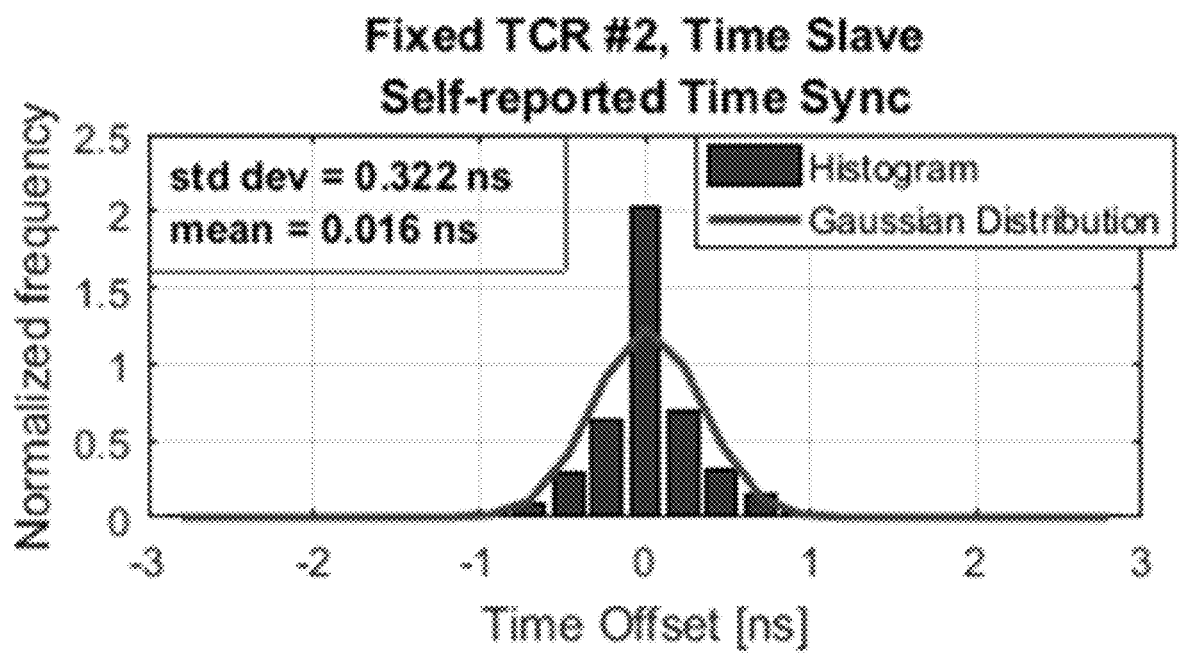
FIG. 18 shows a plot of TCR self-reported synchronization performance for a TCR #2 in an experimental configuration according to aspects of the present disclosure.

FIG. 18 shows a plot of TCR self-reported synchronization performance for a TCR #2 in an experimental configuration according to aspects of the present disclosure.

Figure 19:
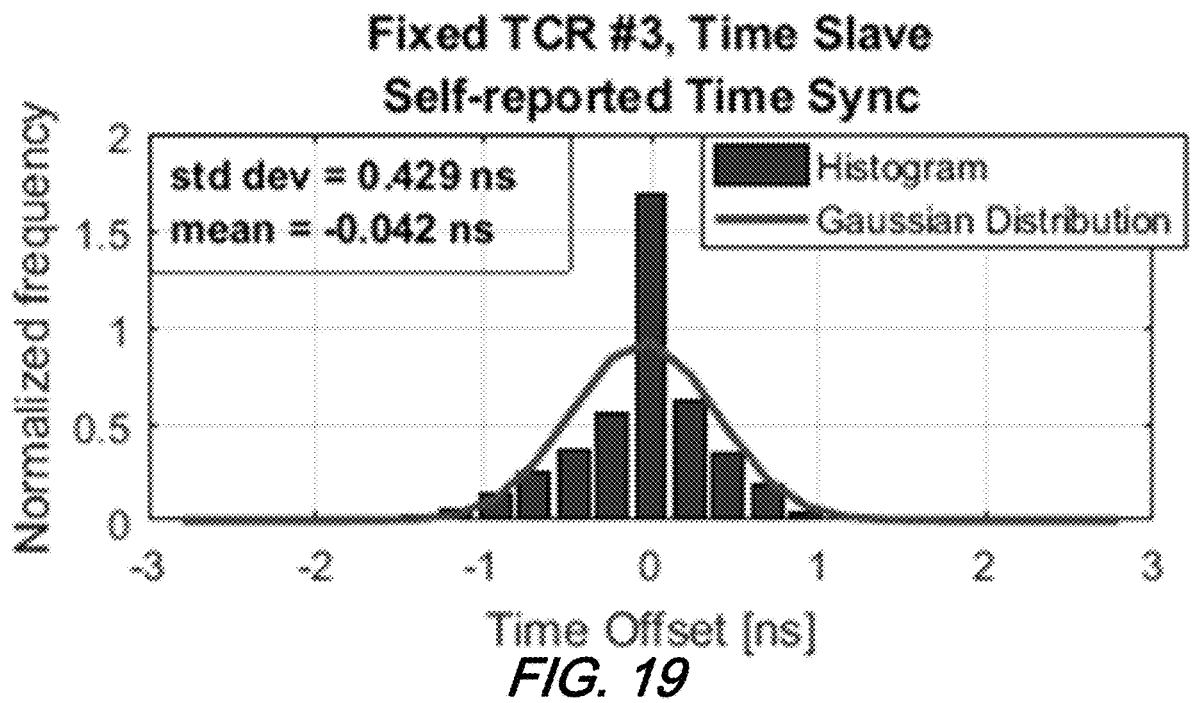
FIG. 19 shows a plot of TCR self-reported synchronization performance for a TCR #3 in an experimental configuration according to aspects of the present disclosure.

FIG. 19 shows a plot of TCR self-reported synchronization performance for a TCR #3 in an experimental configuration according to aspects of the present disclosure.

Figure 20:
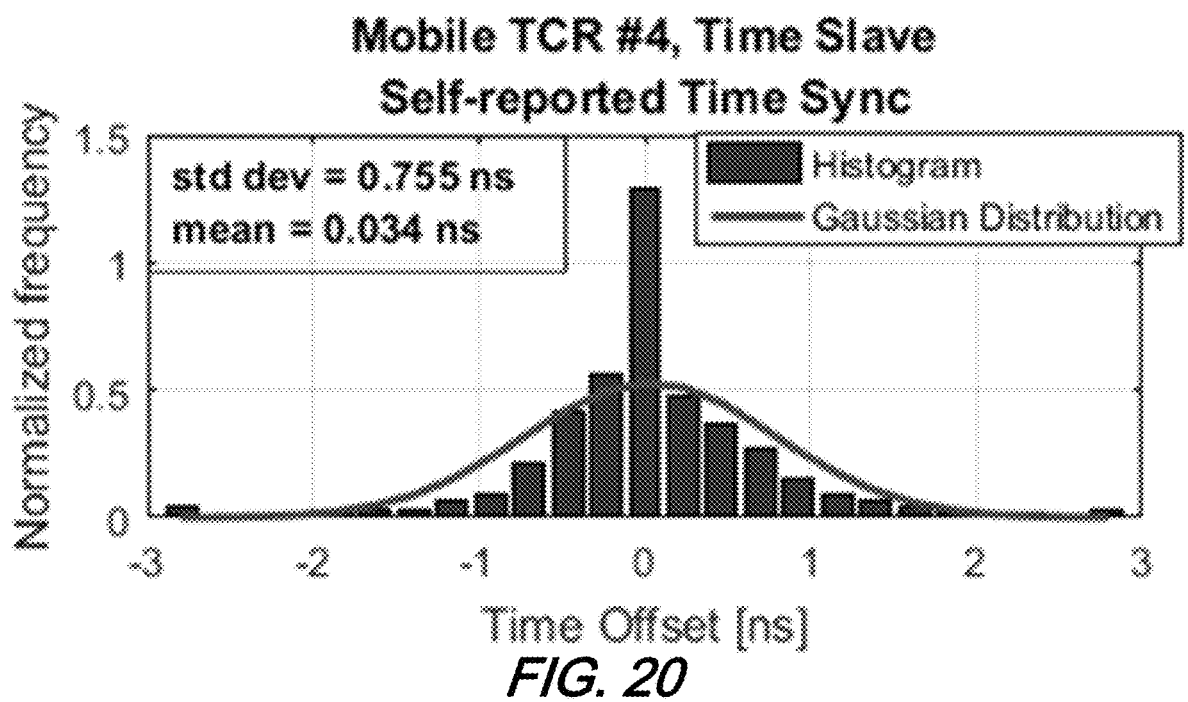
FIG. 20 shows a plot of TCR self-reported synchronization performance for a TCR #4 in an experimental configuration according to aspects of the present disclosure.

FIG. 20 shows a plot of TCR self-reported synchronization performance for a TCR #4 in an experimental configuration according to aspects of the present disclosure.

Figure 21:
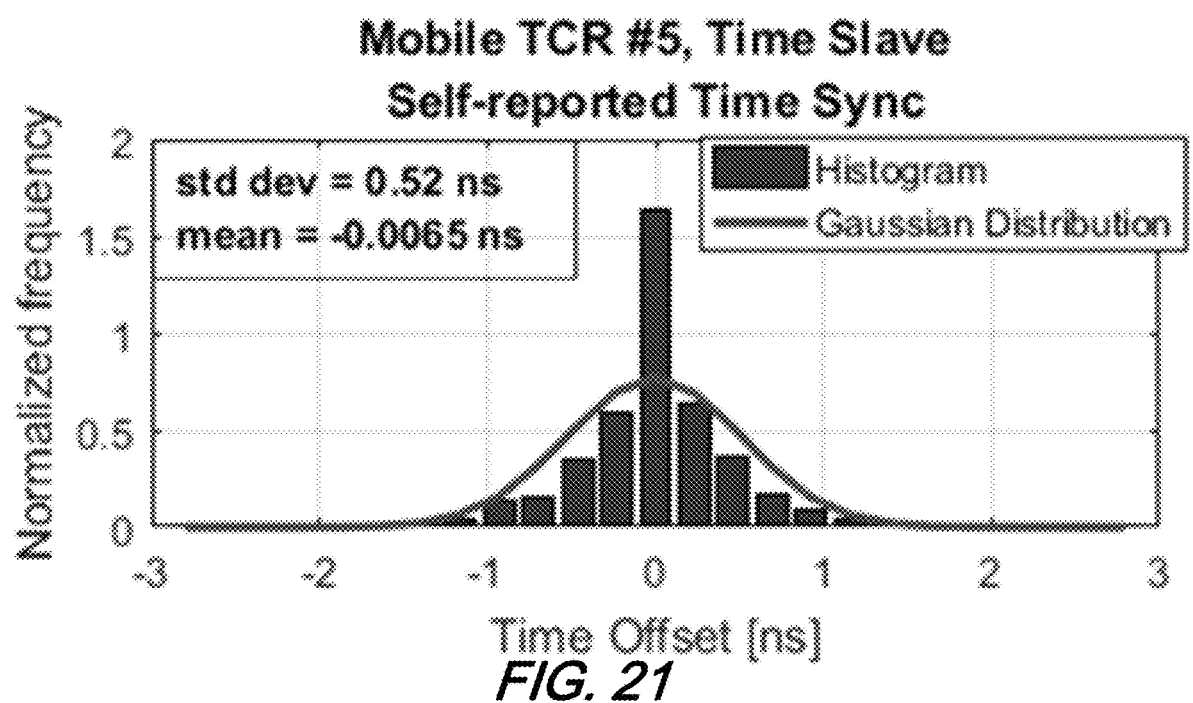
FIG. 21 shows a plot of TCR self-reported synchronization performance for a TCR #5 in an experimental configuration according to aspects of the present disclosure.

FIG. 21 shows a plot of TCR self-reported synchronization performance for a TCR #5 in an experimental configuration according to aspects of the present disclosure.

This set of histogram plots shown illustrate the TCR self-reported synchronization performance for each device, and show a synchronization performance achieved of better than 500 picoseconds precision and zero mean accuracy for stationary synchronized elements, and slightly degraded but still sub-nanosecond precision and zero mean accuracy for the mobile synchronized elements that were in motion during the duration of the test.

Synchronization and Synchronization System Implementation Examples

As will be generally understood and appreciated by those skilled in the art, the general techniques discussed above can be utilized to provide any combination of the specific capabilities:

Disciplining of TCR Device from an external reference
  Distribution of Master Element TCR time reference to Synchronized Element TCR(s)
  Distribution of Master Element TCR reference clock frequency and phase to Synchronized Element TCR(s)
  Distribution of Master Element TCR time, reference clock frequency, and phase to Synchronized Element TCR(s)

Distribution of Master Element TCR reference signals to external systems through generation of synchronized reference signals on the Synchronized Element TCR device(s)

Additionally, the techniques discussed above support flexible synchronization architectures and can be implemented using any of the following:

Hub-spoke synchronization of Synchronized Element TCRs to Master Element

Figure 22:
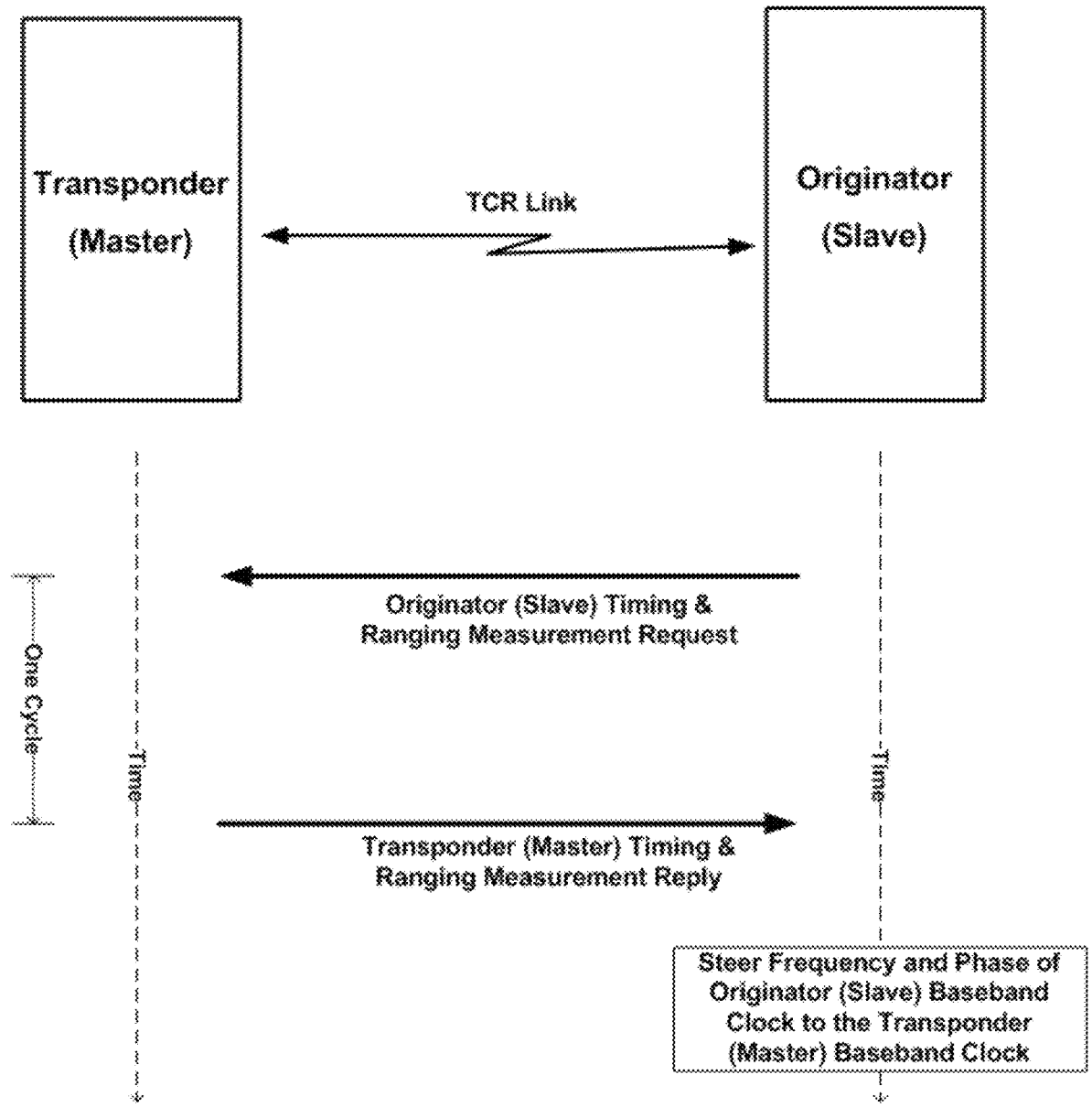
FIG. 22 shows a schematic diagram of an overview of an illustrative single cycle frequency and phase steering/synchronization between Originator (slave) and Transponder (master) according to aspects of the present disclosure.

"Multi-hop" synchronization of Synchronized Element TCRs to other Master or Synchronized Element TCR devices FIG. 22 shows a schematic diagram of an overview of an illustrative single cycle frequency and phase adjustment between Originator (slave) and Transponder (master) according to aspects of the present disclosure. As may be observed from that figure, the Originator initiates an exchange by sending a timing and ranging measurement request to the Transponder. Note that the details of the exchange are not specifically shown in this illustrative overview.

In response, the Transponder transmits to the Originator a reply which the Originator uses to define any adjustment "steering" of its baseband clock.

We note that—according to aspects of the present disclosure—such steering and synchronization may advantageously be performed after only a single request/reply cycle between Originator and Transponder.

FIG. 23 shows a flow diagram of an illustrative single cycle frequency and phase steering/synchronization between Originator (slave) and Transponder (master) according to aspects of the present disclosure.

As illustratively shown in that flow diagram, an originator begins process with a measurement request by initiating a baseband clock cycle counter and transmitting to the transponder a modulated carrier signal.

Upon receipt of the modulated carrier signal, the transponder starts a baseband clock cycle counter, measures/determines carrier phase, carrier phase slope, code phase, and code phase slope.

As a reply, the transponder begins transmission of a modulated carrier signal and transmits the determinations/measurements and the number of elapsed baseband clock cycles to the originator.

Upon receipt of the reply modulated carrier signal, the originator measures the number of elapsed baseband clock cycles, determines carrier phase, carrier phase slope, code phase and code phase slope.

The originator determines the round-trip time of flight (TOF), baseband phase offset, and baseband frequency offset which is determined from carrier phase slopes.

With these determinations/measurements, the originator steers/adjusts the frequency and phase of the originator baseband clock to the transponder baseband clock. We note that such steering/adjustment may be made to an extent that the clocks are substantially synchronized with one another. We note further that the method shown and described—while illustratively described using only a pair of nodes—the process may be extended to a greater number of individual nodes that may constitute a given network of nodes requiring such steering/adjustment/synchronization.

At this point, those skilled in the art will readily appreciate that while the methods, techniques, and structures according to the present disclosure have been described with respect to particular implementations and/or embodiments, those skilled in the art will recognize that the disclosure is not so limited. Accordingly, the scope of the disclosure should only be limited by the claims appended hereto.

What is claimed is:

1. A system for synchronizing the clocks of a plurality of platforms that includes a first platform and a second platform, the system including:
   a first platform and a second platform that is movable relative to the first platform, each of the first and second platform comprising:
   (a) wireless communications module;
   (b) a clock module that provides a fundamental clock having a fundamental frequency and a fundamental phase and a baseband clock having a baseband frequency having a baseband phase, wherein the baseband clock is based on the fundamental clock;
   (c) a transceiver for providing a radio-frequency (RF) signal having an RF clock that is based on the fundamental clock and the baseband clock;
   (d) a processor; and
   (e) a clock-control module that is operative for controlling at least one of the fundamental frequency, the fundamental phase, the baseband frequency, and the baseband phase; and
   wherein the processor of each platform is operative for determining:
   (i) estimating a baseband frequency offset between the respective fundamental frequencies of the first and second platforms, the estimated baseband frequency offset being based on a round-trip RF signal having a first leg transmitted from the first platform to the second platform and a second leg transmitted from the second platform to the first platform, the round-trip RF signal including a carrier phase slope on each of the first and second legs;
   (ii) computing a derived code phase slope from the carrier phase slope that is based on the fundamental frequency, and the baseband frequency for each platform;
   (iii) computing a fractional baseband offset between the respective baseband clocks of the first and second platforms, the fractional baseband offset being based on the number of elapsed baseband clock cycles and the code phase for each of the first and second platforms; and
   (iv) controlling at least one of the fundamental frequency, the fundamental phase, the baseband frequency, and the baseband phase of its respective platform based on a combination of the respective baseband frequency offset and fractional baseband offset of its respective platform.

2. The system of claim 1 wherein the processor of each platform is further operative for determining a carrier frequency offset related to the baseband frequency offset, the carrier frequency offset based on one or more carrier phase slope measurements made during the round-trip RF signal.

3. The system of claim 2 wherein the processor of the first platform is further operative for adjusting the first platform's baseband clock to the second platform's baseband clock.

4. The system of claim 3 wherein the adjusting substantially synchronizes the two baseband clocks.

5. A method for synchronizing the clocks of a plurality of platforms that includes a first platform and a second platform that is movable relative to the first platform, the method comprising:
   estimating a baseband frequency offset between the respective fundamental frequencies of the first and second platforms, the estimated baseband frequency offset being based on a round-trip RF signal having a first leg transmitted from the first platform to the second platform and a second leg transmitted from the second platform to the first platform, the round-trip RF signal including a carrier phase slope on each of the first and second legs;

computing a derived code phase slope from the carrier phase slope that is based on the fundamental frequency, and the baseband frequency for each platform;

computing a fractional baseband offset between a first baseband clock of the first platform and a second baseband clock of the second platform, the fractional baseband offset being based on the number of elapsed baseband clock cycles and the code phase for each of the first and second platforms; and controlling at least one of the fundamental frequency, the fundamental phase, the baseband frequency, and the baseband phase of its respective platform based on a combination of the respective baseband frequency offset and fractional baseband offset of its respective platform.

6. The method of claim 5 wherein the processor of each platform is further operative for determining a carrier frequency offset related to the baseband frequency offset, the carrier frequency offset based on one or more carrier phase slope measurements made during the round-trip RF signal.

7. The method of claim 6 wherein the processor of the first platform is further operative for adjusting the first platform's baseband clock to the second platform's baseband clock.

8. The method of claim 7 wherein the adjusting substantially synchronizes the two baseband clocks.

* * * * *